(12) United States Patent
Lee et al.

(10) Patent No.: US 10,210,513 B2
(45) Date of Patent: Feb. 19, 2019

(54) ELECTRONIC PAYMENT METHOD, SYSTEM, AND DEVICE

(71) Applicant: SK PLANET CO., LTD., Seoul (KR)

(72) Inventors: Won Jun Lee, Seoul (KR); Dong Phil Lim, Seoul (KR); Hye Youn Chung, Seoul (KR); Se Hyun Kim, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 1040 days.

(21) Appl. No.: 14/007,851

(22) PCT Filed: Oct. 11, 2012

(86) PCT No.: PCT/KR2012/008236
§ 371 (c)(1),
(2) Date: Oct. 18, 2013

(87) PCT Pub. No.: WO2013/055114
PCT Pub. Date: Apr. 18, 2013

(65) Prior Publication Data
US 2014/0074726 A1 Mar. 13, 2014

(30) Foreign Application Priority Data

Oct. 13, 2011 (KR) .................. 10-2011-0104774
Oct. 14, 2011 (KR) .................. 10-2011-0105252
Oct. 18, 2011 (KR) .................. 10-2011-0106356

(51) Int. Cl.
G06Q 20/38 (2012.01)
G06Q 20/10 (2012.01)
G06Q 20/40 (2012.01)

(52) U.S. Cl.
CPC ........... G06Q 20/385 (2013.01); G06Q 20/10 (2013.01); G06Q 20/405 (2013.01); G06Q 20/4016 (2013.01)

(58) Field of Classification Search
CPC ....... G06Q 20/10; G06Q 20/40; G06Q 20/385
(Continued)

(56) References Cited

U.S. PATENT DOCUMENTS 7,716,129 B1 * 5/2010 Tan .................. G06Q 20/02
                                                      705/35
8,639,621 B1 * 1/2014 Ellis .................. G06Q 30/0255
                                                      705/41
(Continued)

FOREIGN PATENT DOCUMENTS

KR      100617657 B1    8/2006
KR    1020070075715 A   7/2007
(Continued)

OTHER PUBLICATIONS

ACI drives adoption of multifactor authentication solutions to combat threats to online banking platforms. (Feb. 6, 2007). Business Wire Retrieved from https://dialog.proquest.conn/professional/docview/1071592554?accountid=161862 (Year: 2007).*
(Continued)

*Primary Examiner* — Kito R Robinson
*Assistant Examiner* — Shacole C Tibljas
(74) *Attorney, Agent, or Firm* — Brinks Gilson & Lione

(57) ABSTRACT

Disclosed are an electronic payment method, system and device wherein, in a process for executing an electronic payment, a user's login information is verified in order to determine whether or not the user is a customer having excellent connection frequency, and then the buyer's payment means information and/or preferred payment means information is provided on the basis of the result of the determination, and thus the buyer is able to execute the payment in a more convenient manner.

20 Claims, 8 Drawing Sheets

(58) Field of Classification Search
USPC .............................................. 705/44, 35, 42
See application file for complete search history.

(56) References Cited

U.S. PATENT DOCUMENTS

| | | | |
|---|---|---|---|
| 2004/0006536 A1* | 1/2004 | Kawashima | G06Q 20/04 705/39 |
| 2006/0208065 A1* | 9/2006 | Mendelovich | G06Q 20/04 235/380 |
| 2009/0127332 A1* | 5/2009 | Park | G06Q 20/223 235/380 |
| 2010/0106570 A1* | 4/2010 | Radu | G06Q 20/20 705/14.3 |
| 2010/0216425 A1* | 8/2010 | Smith | G06Q 20/32 455/406 |
| 2011/0166922 A1* | 7/2011 | Fuerstenberg | G06Q 30/02 705/14.39 |
| 2011/0217994 A1* | 9/2011 | Hirson | G06O 20/12 455/466 |
| 2012/0166334 A1* | 6/2012 | Kimberg | G06Q 20/227 705/44 |

FOREIGN PATENT DOCUMENTS

| | | |
|---|---|---|
| KR | 1020070105072 A | 10/2007 |
| KR | 1020080044029 A | 5/2008 |
| KR | 1020100009150 A | 1/2010 |
| KR | 1020100012264 A | 2/2010 |
| KR | 1020100135617 A | 12/2010 |

OTHER PUBLICATIONS

International Search Report dated Jan. 28, 2013 for PCT/KR2012/008236, citing the above reference(s).
Korean Office Action for application No. 10-2011-0105252 dated Nov. 30, 2013, citing the above reference(s).

* cited by examiner

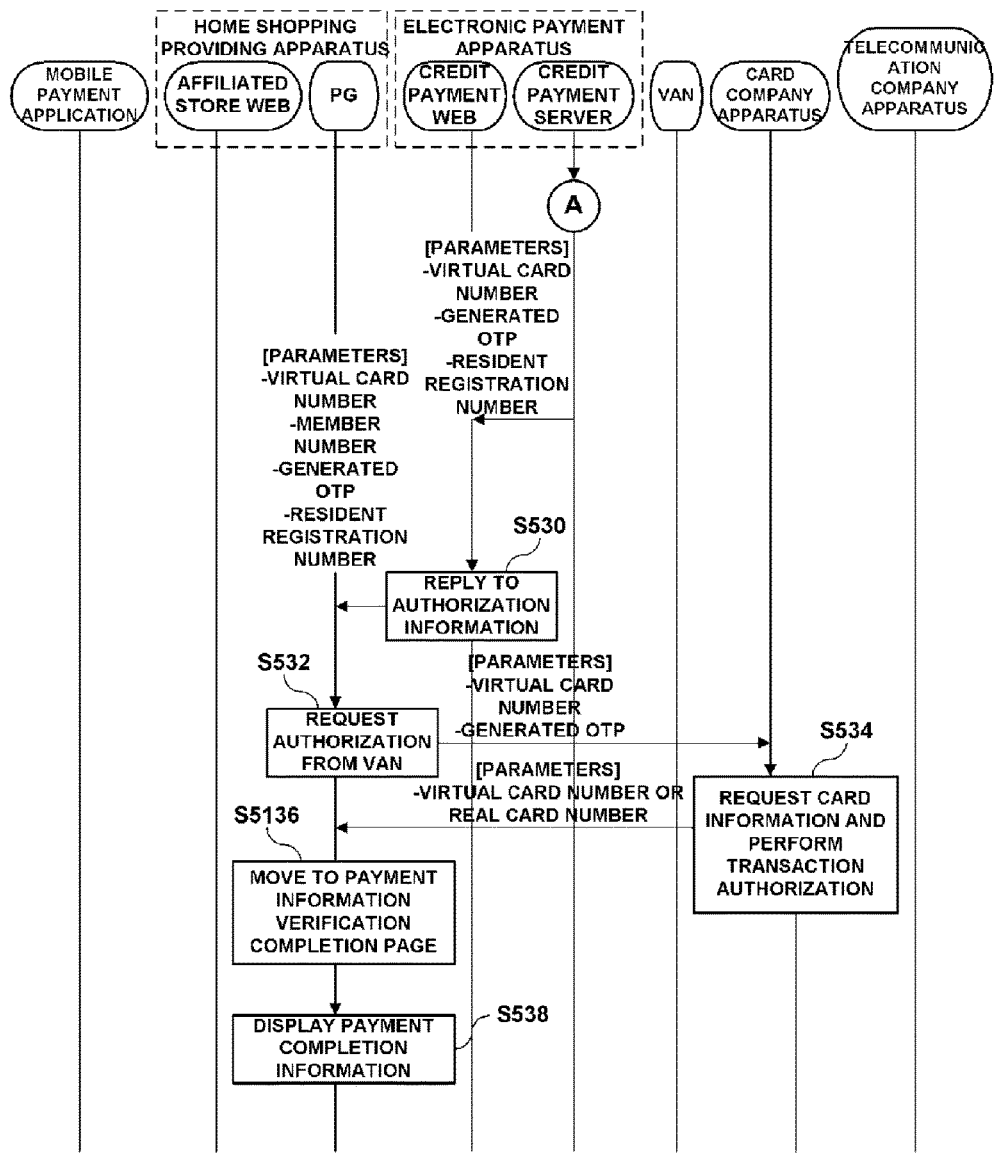

ELECTRONIC PAYMENT METHOD, SYSTEM, AND DEVICE

CROSS REFERENCE TO RELATED APPLICATION

This application claims the priority of Korean Patent Application No. 10-2011-0104774, filed on Oct. 13, 2011, No. 10-2011-0105252, filed on Oct. 14, 2011 and No. 10-2011-0106356, filed on Oct. 18, 2011 in the KIPO (Korean Intellectual Property Office). Further, this application is the National Phase application of International Application No. PCT/KR2012/008236 filed on Oct. 11, 2012, which designates the United States and was published in Korean.

TECHNICAL FIELD

The present invention relates to an electronic payment method, system, and apparatus, which identifies a user's login information in a process of performing an electronic payment to determine whether the user is a customer with high access frequency and provides at least one of information about a purchaser's retained payment method and preferred payment method based on the result of the determination such that the purchaser can perform the payment more conveniently perform the payment.

Moreover, the present invention relates to an electronic payment method, system, and apparatus, which performs authentication through a one-time password (OTP), a telecommunication company, or a card company based on payment method information selected by a user in a process of performing an electronic payment using phone bill information or credit card information such that the user can more safely perform the electronic payment.

BACKGROUND ART

The information disclosed in this section is only to provide background information about the embodiments and does not form the prior art.

A credit card, debit card, or payment through a bank account is generally used to make a payment for general commerce or electronic commerce. However, conventional payment methods have the inconvenience to have cash for cash payment, the risk of loss of cash, the inconvenience to return changes, etc. Meanwhile, in addition to these problems, the use of credit cards has been recommended as a way to increase transparency in taxation of business transactions, and many other payment methods have been developed. In particular, with the steady growth of the electronic commerce on the Internet, the payment market is expanding rapidly. Moreover, while most payment methods on the Internet are credit cards and online payments, new payment methods using mobile phones or wired and wireless automatic response services (ARSs) have recently emerged and their frequency of use is increasing rapidly.

However, in the case of these payment methods, it is inconvenient to get a separate module or card, and damage is caused due to leakage of personal information, which is problematic.

DISCLOSURE

Technical Problem

An object of the present invention to solve the above problems is to provide an electronic payment method, system, and apparatus, which identifies a user's login information in a process of performing an electronic payment to determine whether the user is a customer with high access frequency and provides at least one of information about a purchaser's retained payment method and preferred payment method based on the result of the determination such that the purchaser can more conveniently perform the payment.

Moreover, another object of the present invention to solve the above problems is to provide an electronic payment method, system, and apparatus, which performs authentication through a one-time password (OTP), a telecommunication company, or a card company based on payment method information selected by a user in a process of performing an electronic payment using phone bill information or credit card information such that the user can more safety perform the electronic payment.

Technical Solution

According to an aspect of the present invention to achieve the above objects, there is provided an electronic payment system comprising: a commodity information providing apparatus which transmits commodity information to an accessed user terminal, and when there is a payment request for specific commodity information among the commodity information from the user terminal, transmits payment request information for user account information of the user terminal; and an electronic payment apparatus which receives the payment request information, identifies login information of the user account information, transmits at least one of retained payment method information and preferred payment method information to the user terminal based on the result of the identification, receives payment method information from a terminal having identification information corresponding to the user account information, receives one-time password (OTP) information corresponding to the payment method information, authenticates the OTP information using an external device based on the payment method information, and performs payment processing for the payment request information.

According to another aspect of the present invention to achieve the above objects, there is provided an electronic payment apparatus comprising: a payment information reception unit which receives payment request information for user account information from a commodity information providing apparatus; a login information identification unit which identifies login information of the user account information and transmits at least one of retained payment method information and preferred payment method information to a user terminal, which has accessed the commodity information providing apparatus, based on the result of identification; a payment method synchronization unit which receives payment method information from a terminal having identification information corresponding to the user account information and synchronizes the received information; an OTP information authentication unit which receives OTP information corresponding to the payment method information from the terminal and authenticates the OTP information using at least one of a card company apparatus, a phone bill agency apparatus, and a telecommunication company apparatus based on the payment method information; and a payment authorization unit which, when the OTP information is authenticated, transmits a transaction authorization request signal for the synchronized payment method information to at least one of the card company apparatus, the phone bill agency apparatus, and the telecommunication company apparatus, receives a transaction authorization response signal corresponding to the transaction authorization request signal, and transmits a payment information verification completion signal to the commodity information providing apparatus.

According to still another aspect of the present invention to achieve the above objects, there is provided a terminal comprising: an application execution unit which executes an electronic payment application in response to a push message received from an electronic payment apparatus; a major payment method synchronization unit which, when authentication information input to authenticate payment request information by a user's manipulation or command is authenticated, transmits pre-stored payment method information to the electronic payment apparatus; an OTP information transmission unit which, when the payment method information is synchronized, generates OTP information for the payment method information and transmits the generated OTP information to the electronic payment apparatus; and a payment completion process unit which receives payment completion information from the electronic payment apparatus and displays the received information.

According to yet another aspect of the present invention to achieve the above objects, there is provided an electronic payment method, which performs an electronic payment using login information in an electronic payment apparatus, the electronic method comprising the steps of: receiving payment request information for user account information from a commodity information providing apparatus; identifying login information of the user account information and transmitting at least one of retained payment method information and preferred payment method information to a user terminal, which has accessed the commodity information providing apparatus, based on the result of identification; receiving payment method information from a terminal having identification information corresponding to the user account information and synchronizing the received information; receiving OTP information corresponding to the payment method information from the terminal and authenticating the OTP information using at least one of a card company apparatus and a telecommunication company apparatus based on the payment method information; and when the OTP information is authenticated, transmitting a transaction authorization request signal for the synchronized payment method information to at least one of the card company apparatus and the telecommunication company apparatus, receiving a transaction authorization response signal corresponding to the transaction authorization request signal, and transmitting a payment information verification completion signal to the commodity information providing apparatus.

According to yet another aspect of the present invention to achieve the above objects, there is provided an electronic payment method, which performs an electronic payment using phone bill information or credit card information in an electronic payment apparatus, the electronic payment method comprising the steps of: receiving payment request information for specific user account information from a commodity information providing apparatus; receiving payment method information from a terminal having identification information corresponding to the specific user account information and synchronizing the received information; when OTP information corresponding to the payment method information is received from the terminal, authenticating the OTP information using a telecommunication company apparatus; and when the OTP information is authenticated, transmitting a transaction authorization request signal for the synchronized payment method information to a card company apparatus or a phone bill agency apparatus, receiving a transaction authorization response signal corresponding to the transaction authorization request signal, and transmitting a payment information verification completion signal to the commodity information providing apparatus.

According to still yet another aspect of the present invention to achieve the above objects, there is provided an electronic payment method, which performs an electronic payment using credit card or phone bill information in a terminal, the electronic payment method comprising the steps of: executing an electronic payment application in response to a push message received from an electronic payment apparatus; when authentication information input to authenticate payment request information by a user's manipulation or command is authenticated, transmitting pre-stored payment method information to the electronic payment apparatus; when the payment method information is synchronized, generating OTP information for the payment method information and transmitting the generated information to the electronic payment apparatus; and receiving payment completion information from the electronic payment apparatus and displaying the received information.

Advantageous Effects

According to an embodiment of the present invention, it is possible to enable a purchaser to more conveniently perform the payment by identifying a user's login information in a process of performing an electronic payment to determine whether the user is a customer with high access frequency and providing at least one of information about the purchaser's retained payment method and preferred payment method based on the result of the determination.

According to another embodiment of the present invention, it is possible to receive payment method information depending on login information and more safely perform the payment by authenticating OTP information based on payment method information selected by a user in a process of performing an electronic payment.

According to still another embodiment of the present invention, it is possible to more safely perform an electronic payment by performing authentication through an OTP, a telecommunication company, or a card company based on payment method information selected by a user in a process of performing an electronic payment using phone bill information or credit card information.

According to yet another embodiment of the present invention, it is possible to increase the security for the payment method by performing OTP authentication through a telecommunication company apparatus or a card company apparatus in a process of performing an electronic payment using phone bill information or credit card information and further performing through a phone bill agency apparatus or a telecommunication company.

DESCRIPTION OF DRAWINGS

FIGS. 5A and 5B are flowcharts showing an electronic payment method using credit card information in accordance with another embodiment of the present invention.

MODE FOR INVENTION

Hereinafter, preferred embodiments of the present invention will be described in detail with reference to the accompanying drawings.

As used herein, the term "electronic payment" refers to a payment on online, but not limited thereto, and many alterations and modifications may be made by those having ordinary skill in the art without departing from the spirit of the present invention.

Figure 1:
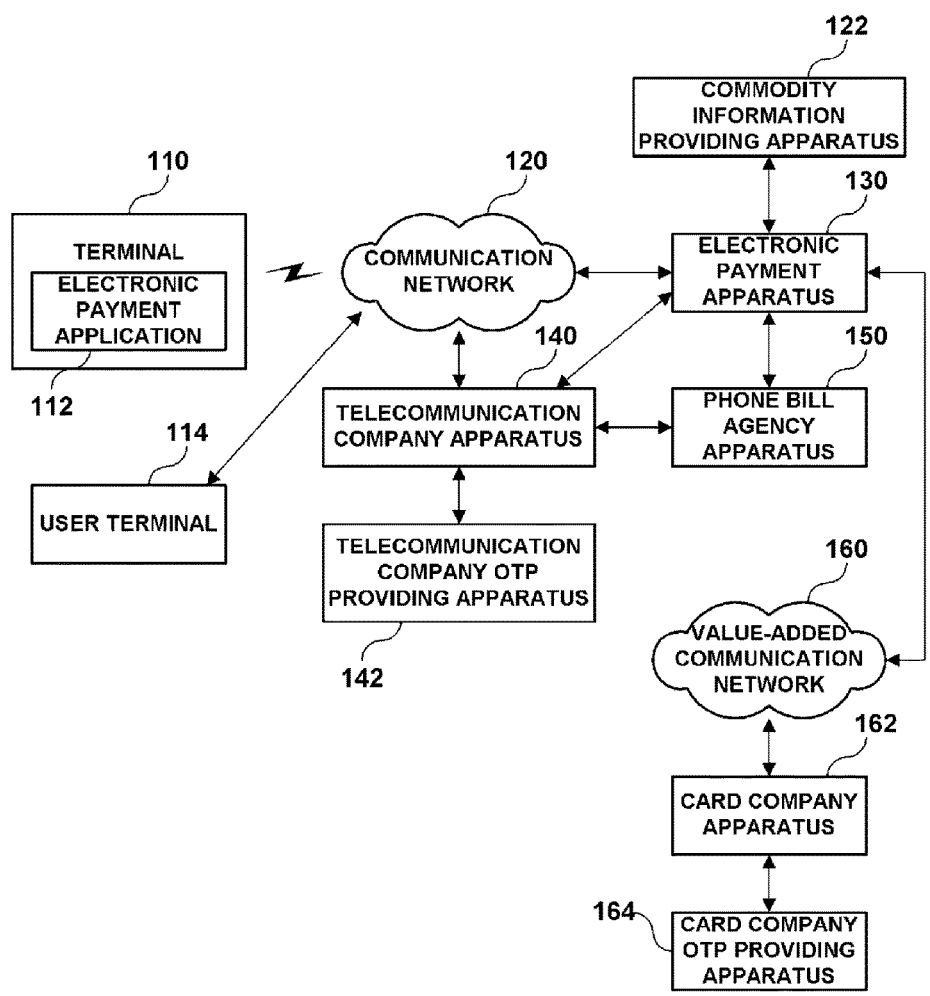
FIG. 1 is a block diagram schematically showing an electronic payment system in accordance with a preferred embodiment of the present invention.

FIG. 1 is a block diagram schematically showing an electronic payment system in accordance with a preferred embodiment of the present invention.

The electronic payment system according to this embodiment comprises a terminal 110, an electronic payment application 112, a user terminal 114, a communication network 120, a commodity information providing apparatus 122, an electronic payment apparatus 130, a telecommunication company apparatus 140, a telecommunication company OTP providing apparatus 142, a phone bill agency apparatus 150, a value-added communication network 160, a card company apparatus 162, and a card company OTP providing apparatus 164. While it is described in this present embodiment that the electronic payment system comprises only the terminal 110, the electronic payment application 112, the user terminal 114, the communication network 120, the commodity information providing apparatus 122, the electronic payment apparatus 130, the telecommunication company apparatus 140, the telecommunication company OTP providing apparatus 142, the phone bill agency apparatus 150, the value-added communication network 160, the card company apparatus 162, and the card company OTP providing apparatus 164, this is merely illustrative of the spirit of this embodiment of the present invention, and many alterations and modifications may be made to the components included in the electronic payment system by those having ordinary skill in the art without departing from the spirit of the present invention.

The terminal 110 refers to a terminal that can transmit and receive various data via the communication network 120 depending on a user's key manipulation and may be any one of a tablet PC, a laptop, a personal computer (PC), a smart phone, a personal digital assistant (PDA), and a mobile communication terminal. Moreover, the terminal 110 may be a cloud computing terminal supporting cloud computing which provides services such as reading, writing, and storing of data, networking, use of content, etc. through the communication network 120.

That is, the terminal 110 performs a voice or data communication using the communication network 120 and refers to a terminal equipped with a browser for communication with the electronic payment apparatus 130 via the communication network 120, a memory for storing programs and protocols, a microprocessor for calculation and control by executing various programs, etc. That is, any terminal is available as long as it provides server-client communication with the electronic payment apparatus 130 and is a broad concept that encompasses all communication computing devices such as a notebook computer, a mobile communication terminal, a PDA, etc. Meanwhile, the terminal 110 may preferably be provided with a touch screen, but not necessarily limited thereto. While the terminal 110 is implemented separately from the electronic payment apparatus 130 in this embodiment, the terminal 110 may be implemented as a standalone device that encompasses the electronic payment apparatus 130 in an actual implementation of the invention.

The terminal 110 executes the electronic payment application 112 in response to the user's manipulation or command and performs member registration through the electronic payment application 112. More specifically, when the terminal 110 is a smart phone, the electronic payment application 112 may be an application downloaded and installed from an application store, whereas when the terminal 110 is a feature phone, it may be an application executed by a virtual machine (VM) downloaded through the telecommunication company apparatus 140.

The terminal 110 should perform the member registration for the electronic payment, and this process will now be described. The terminal 110 performs the member registration through the electronic payment application 112 installed therein. Then, when at least one of message authentication information, user identification information authentication information, and terminal personal identification number (PIN) authentication information, which are input by the user for the member registration is authenticated, the terminal 110 receives an application ID for performing the electronic payment and registers payment method information, thus completing the member registration. Meanwhile, the terminal 110 should download the electronic payment application 112, and this process will now be described. When the user's selection information through an application providing apparatus or the user's selection information through a payment gateway (PG) is input, the terminal 110 downloads the electronic payment application 112 from the application providing apparatus and installs the downloaded electronic payment application 112.

Moreover, in the member registration process, the terminal 110 determines whether the user identification information authentication information input by the user is authenticated. When it is determined that the user identification information authentication information is authenticated, the terminal 110 transmits a user identification information authentication procedure completion signal to the electronic payment apparatus 130 and receives an application ID from the electronic payment apparatus 130. Moreover, when the terminal PIN information input by the user is authenticated, the terminal 110 transmits a terminal PIN procedure completion signal to the electronic payment apparatus 130, registers payment method information input by the user, and receives a registration completion signal from the electronic payment apparatus 130, thus completing the member registration.

Furthermore, when the member registration process is completed, a major payment method is registered, which will now be described. The terminal 110 transmits payment method information selected by the user's manipulation or command to the electronic payment apparatus 130, and when the payment method information is authenticated, stores an OTP authentication key received from the electronic payment apparatus 130 in response to the payment method information, thus completing the registration of the payment method information. At this time, the terminal 110 receives an encrypted OTP authentication key from the electronic payment apparatus 130, decrypts the encrypted OTP authentication key, re-encrypts the decrypt OTP authentication key together with information (e.g., PIN information) required for the authentication, and stores the resulting OTP authentication key. Here, the payment method information includes at least one of credit card information, check card information, phone bill information, and financial account information. For the operation of the terminal 110, the terminal 110 uses the electronic payment application 112 installed therein.

That is, for the registration of the credit card information, the terminal 110 transmits payment method information including the credit card information as the major payment method to the electronic payment apparatus 130, selects any one of information from company information received from the electronic payment apparatus 130 and transmits payment method authentication information including at least one of phone number information for the selected company information, card company identification information, card nickname information, card number information, card expiration date information, virtual card number information, and CVC information to the electronic payment apparatus 130. Then, the terminal 110 stores an OTP authentication key received from the electronic payment apparatus 130 in response to the payment method information as the payment method information, thus completing the registration of the payment method information.

Moreover, for the registration of the phone bill information, the terminal 110 transmits payment method information including the phone bill information as the payment method to the electronic payment apparatus 130 and transmits phone bill registration information including at least one of phone number information and electronic payment application ID information depending on phone bill registration request information received from the electronic payment apparatus 130 to a payment method registration apparatus. Then, the terminal 110 stores an OTP authentication key received in response to the phone bill information as the payment method information from the electronic payment apparatus 130, thus completing the registration of the payment method information.

Meanwhile, the terminal 110 may inquire or change the payment method, and this process will be described in more detail below. When inquiry request information for the payment method information is input by the user's manipulation or command, the terminal 110 transmits the inquiry request information to the electronic payment apparatus 130 and receives corresponding transaction history identification information from the electronic payment apparatus 130. Moreover, when change request information for the payment method information is input by the user's manipulation or command, the terminal 110 transmits the change request information to the electronic payment apparatus 130 and receives corresponding change completion information from the electronic payment apparatus 130.

The terminal 110 executes the electronic payment application 112 in response to a push message received from the electronic payment apparatus 130. Moreover, when authentication information input to authenticate payment request information by the user's manipulation or command is authenticated, the terminal 110 transmits selected payment method information to the electronic payment apparatus 130, generates OTP information based on the payment method information when the payment method information is synchronized with the electronic payment apparatus 130, transmits the generated information to the electronic payment apparatus 130, receives payment completion information from the electronic payment apparatus 130, and displays the received information. Here, the authentication information is PIN information on the electronic payment application 112. The personal identification number (PIN) is generally set to a four-digit number, and an eight-digit personal unblocking key (PUK) is stored in the PIN. Meanwhile, the PIN may be changed according to the user's need. When the user inputs the PIN incorrectly more than a predetermined number of times in succession, a corresponding subscriber identification module is locked, and thus the PIN can be reset by inputting the PUK. However, also when the PUK is input more than a predetermined number of times, it is necessary to discard the corresponding PUK and get a new PUK.

The electronic payment application 112 refers to software that transmits payment method information selected by the user's manipulation or command, and when the payment method information is authenticated, stores an OTP authentication key received in response to the payment method information, thus completing the registration of the payment method information. The electronic payment application 112 may be implemented or designed to meet various operating system (OS) environments such as iOS, Android, Window Phone 7, etc.

Meanwhile, it is described that the terminal 110 is provided with the electronic payment application 112 to perform the member registration, but this operation process can be achieved only by the electronic payment application 112. That is, the electronic payment application 112 may be installed in the terminal 110 and executed in response to a push message received from the electronic payment apparatus 130. The functions of the electronic payment application 112 such as, when authentication information input to authenticate payment request information by the user's manipulation or command is authenticated, transmitting selected payment method information to the electronic payment apparatus 130, generating OTP information based on the payment method information when the payment method information is synchronized with the electronic payment apparatus 130, transmitting the generated OTP information to the electronic payment apparatus 130, receiving payment completion information from the electronic payment apparatus 130, and displaying the received information can be independently implemented.

The user terminal 114 is a device separate from the terminal 110 and refers to a terminal that can transmit and receive various data via the communication network 120 depending on the user's key manipulation and may be any one of a tablet PC, a laptop, a personal computer, a smart phone, a personal digital assistant, and a mobile communication terminal. Moreover, the user terminal 114 refers to a terminal equipped with a web browser for communication with the commodity information providing apparatus 122 in conjunction with the communication network 120, a memory for storing programs, a microprocessor for calculation and control by executing the programs, etc. That is, while the user terminal 114 is generally a personal computer, any terminal is available as long as it is connected to the communication network 120 and provides server-client communication with the commodity information providing apparatus 122, and the user terminal 114 is a broad concept that encompasses all communication computing devices such as a notebook computer, a mobile communication terminal, a PDA, etc. That is, after accessing the commodity information providing apparatus 122 in response to the user's manipulation or command, the user terminal 114 receives various commodity information from the commodity information providing apparatus 122 and displays the received information. At this time, the user may log into the commodity information providing apparatus 122 with his or her user account (ID and password) using the user terminal 114 and select payment request information from the commodity information provided by the commodity information providing apparatus 122 when he or she wants to purchase a specific commodity.

The user terminal 114 according to this embodiment allows user account information to be automatically logged into the commodity information providing apparatus 122 based on whether the commodity information providing apparatus 122 supports automatic login and approves automatic login for the user account information. For example, the user terminal 114 accesses a website provided by the commodity information providing apparatus 122 and, when the website supports the automatic login and the user approves the automatic login, the user terminal 114 allows the user account information to be automatically logged into the commodity information providing apparatus 122. Of course, the automatic login technique is not necessarily limited thereto and may be used in a manner that a browser installed in the user terminal 114 matches identification information of the corresponding website with the user account information input by the user and stores the matched information regardless of whether the commodity information providing apparatus 122 supports the automatic login.

The communication network 120 refers to a network that can transmit and receive data via the Internet protocol using various wired and wireless communication technologies such as the Internet network, Intranet network, mobile communication network, satellite communication network, etc. Moreover, the communication network 120 may comprise a cloud computing network which is connected to the electronic payment apparatus 130 to store computing resources such as hardware, software, etc. and provide the computing resources required by a client to the corresponding terminal 110. Here, the cloud computing refers to a computing environment where information is permanently stored in a server on the Internet and temporarily stored in a client terminal such as a desktop, tablet, notebook, netbook, smart phone, etc., and the cloud computing network refers to a computer environment access network where all users' information is stored in a server on the Internet such that the information can be used anywhere and anytime through various IT devices.

The communication network 120 is a concept that generally refers to closed networks such as a local area network, wide area network (WAN), etc., open networks such as the Internet, etc., wireless communication networks such as code division multiple access (CDMA), wideband code division multiple access (WCDMA), global system for mobile communications (GSM), long term evolution (LTE), evolved packet core (EPC), etc., next-generation networks which will be implemented in the future, and cloud computing networks.

When the terminal 110 has accessed the commodity information providing apparatus 122, the commodity information providing apparatus 122 transmits commodity information to the terminal 110 through the communication network 120, and when a payment signal for specific commodity information is received from the terminal 110, transmits the payment request to the electronic payment apparatus 130. The electronic payment apparatus 130 according to this embodiment transmits commodity information to the accessed user terminal 114, and when a payment request for specific commodity information among the commodity information is received from the user terminal 114, transmits payment request information for the user account information of the user terminal 114. For example, after accessing the commodity information providing apparatus 122 through the user terminal 114, the user logs into (or automatically logs into) the commodity information providing apparatus 122 using his or her user account (ID and password) and selects payment request information from the commodity information provided by the commodity information providing apparatus 122 when he or she wants to purchase a specific commodity. The commodity information providing apparatus 122 comprises at least one of a web providing device for providing specific commodity information and a payment gateway (PG) for linking to the electronic payment apparatus 130 in response to the payment request information.

The electronic payment apparatus 130 is a concept that includes at least one of a card company server, a financial company server, a transportation company server, and an electronic payment server, which perform the electronic payment. Of course, the electronic payment apparatus 130 may be implemented as any one of the card company server, the financial company server, the transportation company server, and the electronic payment server.

The electronic payment apparatus 130 has the same configuration as a typical web server or network server. However, in a software configuration, the electronic payment apparatus 130 includes a program module implemented using languages such as C, C++, Java, Visual Basic, Visual C, etc. The electronic payment apparatus 130 may be implemented in the form of a web server or network server, and the web server refers to a computer system, which is connected to an unspecified number of clients and/or other servers through an open computer network such as the Internet, receives an operation execution request from a client or another web server, and provides the corresponding operation result, and a computer software (web server program) installed for the same. However, it should be understood that the electronic payment apparatus 130 is a broad concept that encompasses a series of application programs executed on the web server and various databases built therein according to circumstances, in addition to the above-mentioned web server program. The electronic payment apparatus 130 may be implemented on a typical server hardware using various web server programs provided for various operating systems such as DOS, Windows, Linux, UNIX, Macintosh, etc. Representative examples thereof may include Website, Internet Information Server (IIS), etc. used in Window environment and CERN, NCSA, APPACH, etc. used in UNIX environment.

Moreover, the electronic payment apparatus 130 may be connected to an authentication system for member registration and a payment system. Furthermore, the electronic payment apparatus 130 classifies member subscription information and stores and manages the information in a member database, which may be implemented inside or outside the electronic payment apparatus 130. Such a database refers to a typical data structure implemented in a storage space (e.g., a hard disk or memory) of a computer system using a database management system (DBMS), in which retrieval (extraction), deletion, edition, addition, etc. of data can be freely performed. The database may be implemented to achieve the purpose of this embodiment using a relational database management system (RDBMS) such as Oracle, Infomix, Sybase, DB2, etc., an object-oriented database management system (OODBMS) such as Gemston, Orion, O2, etc. or an XML native database such as Excelon, Tamino, Sekaiju, etc., and has appropriate fields or elements to achieve their functions.

The electronic payment apparatus 130 may provide an electronic payment service in conjunction with the electronic payment application 112 installed in the terminal 110. That is, when a payment request signal is received from the electronic payment application 112 installed in the terminal 110, the electronic payment apparatus 130 may perform the electronic payment in conjunction with a financial company apparatus. Meanwhile, a member registration process should be performed before performing the electronic payment is performed by the electronic payment apparatus 130. To this end, when at least one of a message authentication procedure completion signal, a user identification information authentication procedure completion signal, and a terminal PIN procedure completion signal is received from the terminal 110, the electronic payment apparatus 130 identifies the member subscription for the user information of the terminal 110, assigns an application ID for the electronic payment, and registers payment method information, thus completing the member registration for the user information of the terminal 110. Here, the payment method information includes at least one of credit card information, check card information, phone bill information, and financial account information.

Moreover, in order to perform the electronic payment, a major payment method registration process should be performed after the member registration process is completed. To this end, when the authentication for the payment method information received from the terminal 110 is completed, the electronic payment apparatus 130 generates an OTP authentication key using an external device based on the payment method information, transmits the generated OTP authentication key to the terminal 110, and registers the payment method information. At this time, the electronic payment apparatus 130 transmits the OTP authentication key after encryption to the terminal 110, and this member registration process of the electronic payment apparatus 130 will now be described in more detail. The electronic payment apparatus 130 receives payment method information from the terminal 110, generates an OTP authentication key using an external device based on the payment method information, registers the payment method information, transmits the generated OTP authentication key to the terminal 110, and controls the payment method information to be inquired or changed in response to a request of the terminal 110.

That is, when the credit card information is to be registered as the major payment method, the electronic payment apparatus 130 inquires payment company information based on the payment method information, and when the payment method included in the payment method information is credit card information, transmits card company information corresponding to the inquired payment company information to the terminal 110. The electronic payment apparatus 130 authenticates the validity of payment method authentication information received from the terminal 110 using the card company apparatus corresponding to the card company information for the validity authentication of the credit card during the registration of the credit card information. Here, the payment method authentication information includes at least one of phone number information, card company identification information, card nickname information, card number information, card expiration date information, virtual card number information, and CVC information, and the card nickname information refers to the information input by the user's manipulation or command. t this time, the electronic payment apparatus 130 transmits at least one of card nickname information, phone number information, card expiration date information, virtual card number information, CVC information, and identification information of the terminal 110 to the card company apparatus to authenticate the validity. Moreover, the electronic payment apparatus 130 generates an OTP authentication key for validated information using a card company OTP providing apparatus connected to the card company apparatus for the generation of the OTP authentication key during the registration of the credit card information. Furthermore, when at least one of the OTP authentication key, card nickname information, virtual card number information, and validated information is identified, the electronic payment apparatus 130 registers the payment method information for the registration of the payment method during the registration of the credit card information.

Moreover, when the phone bill information is to be registered as the major payment method, the electronic payment apparatus 130 inquires payment company information based on the payment method information, and when the payment method included in the payment method information is phone bill information, transmits phone bill request information corresponding to the inquired payment company information to the terminal 110. When phone bill registration is received from the terminal 110 for the generation of the OTP authentication key during registration of a phone bill, the electronic payment apparatus 130 generates an OTP authentication key about the phone bill registration information using the telecommunication company apparatus 140 connected to the terminal 110. Here, the phone bill information includes at least one of phone number information and electronic payment application ID information of the electronic payment application installed in the terminal 110. Moreover, for the generation of the OTP authentication during the registration of the phone bill, the electronic payment apparatus 130 transmits an OTP authentication request signal for the phone number information to the telecommunication company apparatus 140 and receives a corresponding OTP authentication key from the telecommunication company apparatus 140. At this time, the telecommunication company apparatus 140 generates an OTP authentication key for the payment method information using the telecommunication company OTP providing apparatus connected thereto.

Meanwhile, during the inquiry or change of the payment method information, when inquiry request information for the payment method information is received from the terminal 110, the electronic payment apparatus 130 transmits transaction history identification information inquired through a payment mobile web server or a PG web server to the terminal 110. Moreover, when change request information for the payment method information is received from the terminal 110, the electronic payment apparatus 130 changes the payment method based on the change request information and transmits change completion information to the terminal 110.

When the member registration and the major payment method registration are completed in the above manner, the electronic payment can be performed, and an electronic payment method using login information will be described below.

The electronic payment apparatus 130 according to the present embodiment receives payment request information, identifies login information of user account information, transmits at least one of retained payment method information and preferred payment method information to the user terminal 114 based on the result of the identification, receives payment method information and OTP information corresponding to the payment method information from the terminal 110 having identification information corresponding to the user account information, authenticates the OTP information using an external device based on the payment method information, and performs payment processing for the payment request information. Meanwhile, the electronic payment apparatus 130 includes a payment web providing device for requesting the OTP information from the terminal 110 having identification information corresponding to the user account information. Here, the identification information includes at least one of phone number information, mobile directory number (MDN), and electronic serial number (ESN).

The operation of the electronic payment apparatus 130 according to the present embodiment will now be described in more detail. The electronic payment apparatus 130 receives payment request information for user account information from the commodity information providing apparatus 122 and transmits at least one of retained payment method information and preferred payment method information to the user terminal 114, which has accessed the commodity information providing apparatus 122, based on the result of the identification of the login information of the user account information. Moreover, the electronic payment apparatus 130 receives payment method information from the terminal 110 having identification information corresponding to the user account information, synchronizes the received information, receives OTP information corresponding to the payment method information from the terminal 110, and authenticates the OTP information using at least one of the card company apparatus and the telecommunication company apparatus based on the payment method information. Furthermore, when the OTP information is authenticated, the electronic payment apparatus 130 transmits a transaction authorization request signal for the synchronized payment method information to at least one of the card company apparatus 162 and the telecommunication company apparatus 140, receives a transaction authorization response signal corresponding to the transaction authorization request signal, and transmits a payment information verification completion signal to the terminal 110 or the commodity information providing apparatus 122. Moreover, the electronic payment apparatus 130 may receive and synchronize the payment method information and then inquire a corresponding member using pre-stored phone number information and electronic payment application ID information.

The process in which the electronic payment apparatus 130 authenticates the OTP information will now be described. When the synchronized payment method information is phone bill information, the electronic payment apparatus 130 authenticates the OTP information using the telecommunication company OTP providing apparatus 142 connected to the telecommunication company apparatus 140 by transmitting an OTP authentication request signal to the telecommunication company OTP providing apparatus 142 and receives an OTP authentication response signal corresponding to the OTP authentication request signal, thus determining whether the OTP information is authenticated.

Moreover, when the OTP information is authenticated, the electronic payment apparatus 130 transmits a transaction authorization request signal for the phone bill information to the commodity information providing apparatus 122 and receives a transaction authorization response signal corresponding to the transaction authorization request signal from the phone bill agency apparatus 150 connected to the commodity information providing apparatus 122.

Meanwhile, a process in which the electronic payment apparatus 130 verifies a black list for the transaction authorization will now be described. The electronic payment apparatus 130 performs black list (B/L) verification for the transaction authorization request signal through the phone bill agency apparatus 150, and when the B/L verification is completed, receives a transaction authorization response signal corresponding to the transaction authorization request signal from the phone bill agency apparatus 150. Moreover, the phone bill agency apparatus 150 performs the B/L verification by comparing pre-stored terminal IP B/L information, USIM B/L information, terminal identification B/L information, and parameters included in the transaction authorization request signal.

Next, a process in which the electronic payment apparatus 130 according to the present embodiment identifies automatic login in conjunction with the user terminal 114 and provides corresponding payment method-related information will be described. For the identification of login information, the electronic payment apparatus 130 determines whether the commodity information providing apparatus 122 supports automatic login and approves automatic login for the user account information and transmits at least one of retained payment method information and preferred payment method information to the user terminal 114 based on the result of the determination. Here, the retained payment method information refers to the payment method pre-registered by the user using the terminal 110 for the electronic payment, and the preferred payment method information refers to the information about the payment method with high frequency selected from the payment methods used by the user. Moreover, when it is determined that the commodity information providing apparatus 122 supports the automatic login and approves the automatic login for the user account information, the electronic payment apparatus 130 identifies the user account information as a customer with high access frequency and transmits the retained payment method information and the preferred payment method information to the user terminal 114. Then, the electronic payment apparatus 130 identifies purchase history information of the user account information of the customer with high access frequency, and when it is determined that the payment request information is a first purchase request, transmits only the retained payment method information to the user terminal 114. The electronic payment apparatus 130 identifies the purchase history information of the user account information of the customer with high access frequency, and when it is determined that there is the purchase history information in the payment request information, transmits only the retained payment method information and the preferred payment method information to the user terminal 114. Moreover, the electronic payment apparatus 130 identifies the payment method of the purchase history information, and when it is determined that the used payment method is one, sets information about the finally used payment method as the preferred payment method.

Here, when the payment method information is credit card information, the transaction authorization request signal includes at least one of card nickname information, virtual card number information, OTP information, and payment information, and the payment information verification completion signal includes link information for a result information page. The card nickname information refers to the information input by the user's manipulation or command. Meanwhile, when the payment method information is phone bill information, the transaction authorization request signal includes at least one of OTP information, virtual card number information, phone number information on the terminal 110, terminal identification information on the terminal 110, member number information corresponding to specific user account information, resident registration number information corresponding to specific user account information, and payment information, and the payment information verification completion signal includes link information for a result information page.

Next, a process in which the electronic payment apparatus 130 performs the electronic payment when the payment method information is credit card information will be described. For the authentication of the OTP information, the electronic payment apparatus 130 identifies the payment method information synchronized with the terminal 110, and when it is determined that the payment method information is credit card information, authenticates the OTP information using the card company OTP providing apparatus 164 connected to the card company apparatus 162. Here, the electronic payment apparatus 130 transmits an OTP authentication request signal to the card company OTP providing apparatus 164, receives an OTP authentication response signal corresponding to the OTP authentication request signal, and determines whether the OTP information is authenticated. Moreover, when receiving OTP information corresponding to the credit card information, the electronic payment apparatus 130 identifies telecommunication company member information on the terminal 110 using the telecommunication company apparatus 140. Furthermore, when the telecommunication company member information is identified as an authorized member, the electronic payment apparatus 130 transmits an authorization request signal for the electronic payment to the value-added communication network 160 and receives an authorization response signal corresponding to the authorization request signal from the value-added communication network 160. Here, the electronic payment apparatus 130 identifies at least one of phone number information, electronic payment application ID information, name information, and service subscription information to identify the telecommunication company member state.

Next, a process in which the electronic payment apparatus 130 performs the electronic payment when the payment method information is phone bill information will be described. The electronic payment apparatus 130 identifies the synchronized payment method information, and when it is determined that the payment method information is phone bill information, authenticates the OTP information using the telecommunication company OTP providing apparatus 142 connected to the telecommunication company apparatus 140. Here, the electronic payment apparatus 130 transmits an OTP authentication request signal to the telecommunication company OTP providing apparatus 142, receives an OTP authentication response signal corresponding to the OTP authentication request signal, and determines whether the OTP information is authenticated. Moreover, when the OTP information for the phone bill information is authenticated, the electronic payment apparatus 130 transmits a transaction authorization request signal for the phone bill information to the commodity information providing apparatus 122. Moreover, the electronic payment apparatus 130 receives a transaction authorization response signal corresponding to the transaction authorization request signal from the phone bill agency apparatus 150 connected to the commodity information providing apparatus 122. Moreover, the electronic payment apparatus 130 performs black list (B/L) verification for the transaction authorization request signal through the phone bill agency apparatus 150, and when the B/L verification is completed, receives a transaction authorization response signal corresponding to the transaction authorization request signal from the phone bill agency apparatus 150.

The electronic payment apparatus 130 according to the present embodiment transmits a push message for executing the electronic payment application 112 to the terminal 110 having identification information corresponding to the user account information of the user that has accessed the commodity information providing apparatus 122. Here, the push message includes at least one message based on short message service (SMS), multimedia message service (MMS), and Internet protocol (IP).

The process of transmitting the push message will now be described in more detail. The electronic payment apparatus 130 determines whether there is pre-stored identification information, and when it is determined that there is the pre-stored identification information, transmits the push message to the terminal 110 having the pre-stored identification information. Whereas, when it is determined that there is no pre-stored identification information, the electronic payment apparatus 130 receives identification information from the user terminal 114 that has accessed the commodity information providing apparatus 122 and transmits the push message to the terminal 110 having the received identification information. For example, after accessing the commodity information providing apparatus 122 through the user terminal 114, the user logs into the commodity information providing apparatus 122 using his or her user account (ID and password) and selects payment request information from commodity information provided by the commodity information providing apparatus 122 when he or she wants to purchase a specific commodity. At this time, when phone number information corresponding to the identification information is pre-stored in the user account, the electronic payment apparatus 130 transmits the push message to a terminal having the pre-stored phone number information. Whereas, when the phone number information corresponding to the identification information is not pre-stored in the corresponding account, the electronic payment apparatus 130 requests the user to enter the phone number and then transmits the push message to the terminal using the input phone number information.

Meanwhile, the electronic payment apparatus 130 may further comprise a cloud computing storage unit and a cloud computing unit for cloud computing. The cloud computing storage unit receives payment request information for user account information from the commodity information providing apparatus 122, transmits at least one of retained payment method information and preferred payment method information to the user terminal 114, which has accessed the commodity information providing apparatus 122, based on the result of identification of login information of the user account information, receives payment method information from the terminal 110 having identification information corresponding to the user account information, synchronizes the received information, receives OTP information corresponding to the payment method information from the terminal 110, authenticates the OTP information using at least one of the card company apparatus 162 and the telecommunication company apparatus 140 based on the payment method information, transmits a transaction authorization request signal for the synchronized payment method information to at least one of the card company apparatus 162 and the telecommunication company apparatus 140, receives a transaction authorization response signal corresponding to the transaction authorization request signal, and stores a payment information verification completion signal, which will be transmitted to the terminal 110 or the commodity information providing apparatus 122, in a storage medium, and the clouding computing unit allows the terminal 110 to read and write data from and to the storage medium.

The telecommunication company apparatus 140 refers to an apparatus that performs various functions required for wireless call processing in conjunction with the communication network 120, such as basic and additional service processing for allowing the terminal 110 to receive a voice or data communication service, subscribers' incoming and outgoing call processing, location registration procedure and handoff procedure processing, connection with other networks, etc. When a control signal is received from the electronic payment apparatus 130 to transmit a message authentication message for the member registration, the telecommunication company apparatus 140 transmits a message authentication message in a predetermined message specification to the terminal 110. Here, the telecommunication company apparatus 140 uses a message center to transmit the message authentication message in the predetermined message specification. Meanwhile, the telecommunication company apparatus 140 according to the present embodiment receives a request signal for telecommunication company member information from the electronic payment apparatus 130 and transmits a response signal determining whether the corresponding telecommunication company member information is authenticated to the electronic payment apparatus 130.

The telecommunication company OTP providing apparatus 142 refers to an apparatus that provides an OTP for the telecommunication company in conjunction with the telecommunication company apparatus 140. Here, the one-time password (OTP) refers to a method of generating and inputting a different password each time, instead of a fixed password. That is, the one-time password refers to an authentication solution that can reduce the exposure of passwords and the possibility of illegal use of user accounts since the reuse of passwords is impossible. That is, the one-time password is used as a two-factor authentication method in financial sites due to its excellent security and mobility, and a hardware token or software token (mobile OTP) generator may be separately required to use the one-time password.

The phone bill agency apparatus 150 refers to an apparatus that basically performs the function of paying communication fees in conjunction with the telecommunication company apparatus 140 and performs payment authorization for the cost corresponding to a phone bill payment made by the terminal 110. That is, when the user of the terminal 110 requests a phone bill payment, the phone bill agency apparatus 150 performs the function of paying the cost corresponding to a payment request signal and authenticates the information related to the phone bill payment. Meanwhile, the phone bill agency apparatus 150 according to the present embodiment performs B/L verification by comparing pre-stored terminal IP B/L information, USIM B/L information, terminal identification B/L information, and parameters included in the transaction authorization request signal.

The value-added communication network 160 is a server operated by a value-added communication network provider and connected between the electronic payment apparatus 130 and the card company apparatus 162 to mediate request information for the electronic payment and transmit and receive data.

The card company apparatus 162 is a server that can perform the electronic payment by performing the function of paying the cost corresponding to a payment request signal for a pre-registered credit card or check card and authenticating the information related to the credit card or check card. Moreover, the card company apparatus 162 according to the present embodiment performs authentication for the payment method authentication information including at least one of the phone number information, card company identification information, card nickname information, card number information, card expiration date information, virtual card number information, and CVC information, which are received from the electronic payment apparatus 130. Furthermore, the card company apparatus 162 generates an OTP authentication key for the payment method information using the card company OTP providing apparatus 164 connected to the card company apparatus 162. Here, the card company OTP providing apparatus 164 refers to an apparatus that provides an OTP for the card company in conjunction with the card company apparatus 162.

Figure 2:
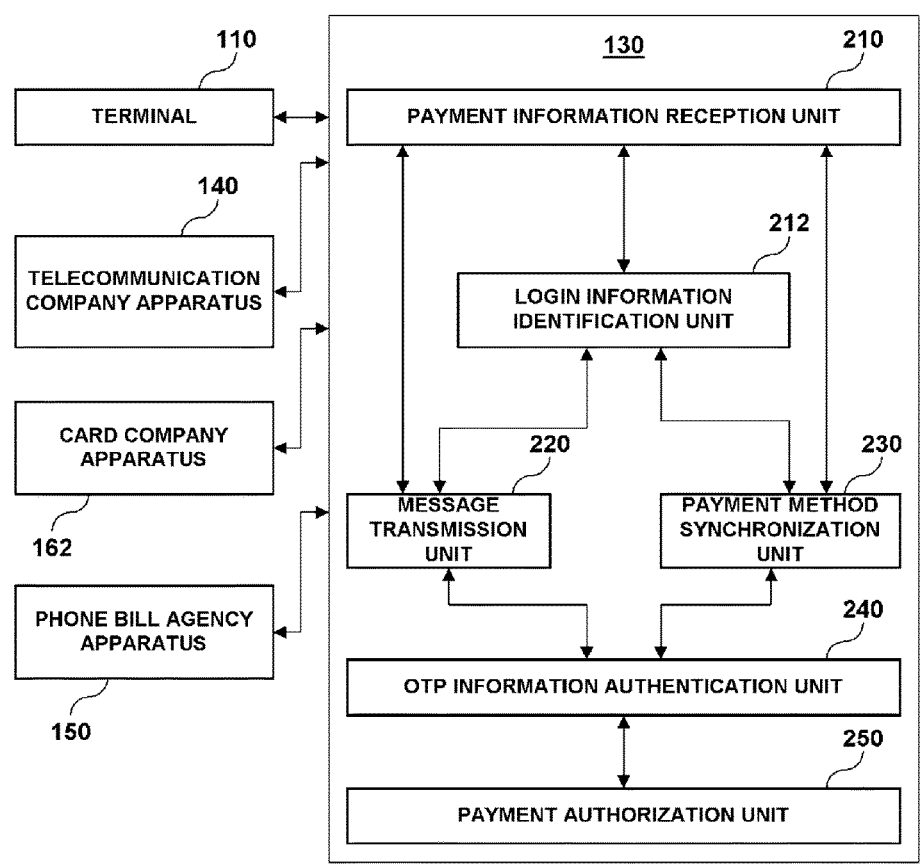
FIG. 2 is a block diagram schematically showing an electronic payment apparatus in accordance with a preferred embodiment of the present invention.

FIG. 2 is a block diagram schematically showing an electronic payment apparatus in accordance with a preferred embodiment of the present invention.

The electronic payment apparatus 130 according to the present embodiment comprises a payment information reception unit 210, a login information identification unit 212, a message transmission unit 220, a payment method synchronization unit 230, an OTP information authentication unit 240, and a payment authorization unit 250. While it is described in this present embodiment that the electronic payment apparatus 130 comprises only the payment information reception unit 210, the login information identification unit 212, the message transmission unit 220, the payment method synchronization unit 230, the OTP information authentication unit 240, and the payment authorization unit 250, this is merely illustrative of the spirit of the embodiment of the present invention, and many alterations and modifications may be made to the components included in the electronic payment apparatus 130 by those having ordinary skill in the art without departing from the spirit of the present invention.

The payment information reception unit 210 receives payment request information for user account information from the commodity information providing apparatus 122. That is, the payment information reception unit 210 receives user account information logged in by the user terminal 114, which has accessed the commodity information providing apparatus 122, from the commodity information providing apparatus 122.

The login information identification unit 212 identifies login information of the user account information and transmits at least one of retained payment method information and preferred payment method information to the user terminal 114, which has accessed the commodity information providing apparatus 122, based on the result of identification. The operation of the login information identification unit 212 will now be described in more detail. The login information identification unit 212 determines whether the commodity information providing apparatus 122 supports automatic login and approves automatic login for the user account information and transmits at least one of retained payment method information and preferred payment method information to the user terminal 114 based on the result of the determination. Here, a process in which the login information identification unit 212 identifies a customer with high access frequency will be described. When it is determined that the commodity information providing apparatus 122 supports the automatic login and approves the automatic login for the user account information, the login information identification unit 212 identifies the user account information as the customer with high access frequency and transmits the retained payment method information and the preferred payment method information to the user terminal 114. Moreover, the operation process of the login information identification unit 212 in the case where the purchase of the purchaser is the first time will now be described. The login information identification unit 212 identifies purchase history information of the user account information of the customer with high access frequency, and when it is determined that the payment request information is a first purchase request, transmits only the retained payment method information to the user terminal 114. The operation process of the login information identification unit 212 in the case where the purchase of the purchaser is not the first time will now be described. The login information identification unit 212 identifies purchase history information of the user account information of the customer with high access frequency, and when it is determined that there is the purchase history information in the payment request information, transmits only the retained payment method information and the preferred payment method information to the user terminal 114. Moreover, the operation process of the login information identification unit 212 in the case where the payment method of the purchaser is one will now be described. The login information identification unit 212 identifies the payment method of the purchase history information, and when it is determined that the used payment method is one, sets information about the finally used payment method as the preferred payment method.

The message transmission unit 220 transmits a push message for executing the electronic payment application 112 to the terminal 110. Here, the push message includes at least one message based on short message service (SMS), multimedia message service (MMS), and Internet protocol (IP). Moreover, the message transmission unit 220 determines whether there is pre-stored identification information, and when it is determined that there is the pre-stored identification information, transmits the push message to the terminal 110 having the pre-stored identification information. Whereas, when it is determined that there is no pre-stored identification information, the message transmission unit 220 receives the identification information from the user terminal 114 that has accessed the commodity information providing apparatus 122 and transmits the push message to the terminal 110 having the received identification information.

The payment method synchronization unit 230 receives payment method information from the terminal 110 having identification information corresponding to the user account information and synchronizes the received information. Then, the payment method synchronization unit 230 inquires a corresponding member using pre-stored phone number information and electronic payment application ID information. The OTP information authentication unit 240 receives OTP information corresponding to the payment method information from the terminal 110 and authenticates the OTP information using at least one of the card company apparatus 162 and the telecommunication company apparatus 140 based on the payment method information. Meanwhile, when it is determined that the payment method information synchronized with the terminal 110 is credit card information, the OTP information authentication unit 240 authenticates the OTP information using the card company OTP providing apparatus 164 connected to the card company apparatus 162. Here, the OTP information authentication unit 240 transmits an OTP authentication request signal to the card company OTP providing apparatus 164, receives an OTP authentication response signal corresponding to the OTP authentication request signal, and determines whether the OTP information is authenticated. Moreover, when receiving OTP information corresponding to the credit card information, the OTP information authentication unit 240 identifies telecommunication company member information on the terminal 110 using the telecommunication company apparatus 140. Here, the OTP information authentication unit 240 identifies at least one of phone number information, electronic payment application ID information, name information, and service subscription information to identify the telecommunication company member state. Meanwhile, when it is determined that the payment method information synchronized with the terminal 110 is phone bill information, the OTP information authentication unit 240 authenticates the OTP information using the telecommunication company OTP providing apparatus 142 connected to the telecommunication company apparatus 140. Here, the OTP information authentication unit 240 transmits an OTP authentication request signal to the telecommunication company OTP providing apparatus 142, receives an OTP authentication response signal corresponding to the OTP authentication request signal, and determines whether the OTP information is authenticated.

When the OTP information is authenticated, the payment authorization unit 250 transmits a transaction authorization request signal for the synchronized payment method information to at least one of the card company apparatus 162 and the telecommunication company apparatus 140, receives a transaction authorization response signal corresponding to the transaction authorization request signal, and transmits a payment information verification completion signal to the terminal 110 or the commodity information providing apparatus 122. Here, the transaction authorization request signal includes at least one of OTP information, phone number information on the terminal, terminal identification information on the terminal, member number information corresponding to specific user account information, resident registration number information corresponding to specific user account information, and payment information, and the payment information verification completion signal includes link information for a result information page. Moreover, when the OTP information is authenticated, the payment authorization unit 250 transmits a transaction authorization request signal for the phone bill information to the commodity information providing apparatus 122. Furthermore, the payment authorization unit 250 receives a transaction authorization response signal corresponding to the transaction authorization request signal from the phone bill agency apparatus 150 connected to the commodity information providing apparatus 122.

Meanwhile, a process in which the payment authorization unit 250 verifies a black list for the transaction authorization will now be described. The payment authorization unit 250 performs black list (B/L) verification for the transaction authorization request signal through the phone bill agency apparatus 150, and when the B/L verification is completed, receives a transaction authorization response signal corresponding to the transaction authorization request signal from the phone bill agency apparatus 150. That is, the phone bill agency apparatus 150 performs the B/L verification by comparing pre-stored terminal IP B/L information, USIM B/L information, terminal identification B/L information, and parameters included in the transaction authorization request signal.

Meanwhile, in the case where the payment method is the credit card information, when the telecommunication company member information is identified as an authorized member, the payment authorization unit 250 transmits an authorization request signal for the electronic payment to the value-added communication network 160 and receives an authorization response signal corresponding to the authorization request signal from the value-added communication network 160.

Meanwhile, in the case where the payment method is the phone bill information, when the OTP information for the phone bill information is authenticated, the payment authorization unit 250 transmits a transaction authorization request signal for the phone bill information to the commodity information providing apparatus 122. Moreover, the payment authorization unit 250 receives a transaction authorization response signal corresponding to the transaction authorization request signal from the phone bill agency apparatus 150 connected to the commodity information providing apparatus 122. Furthermore, the payment authorization unit 250 performs black list (B/L) verification for the transaction authorization request signal through the phone bill agency apparatus 150, and when the B/L verification is completed, receives a transaction authorization response signal corresponding to the transaction authorization request signal from the phone bill agency apparatus 150.

Figure 3:
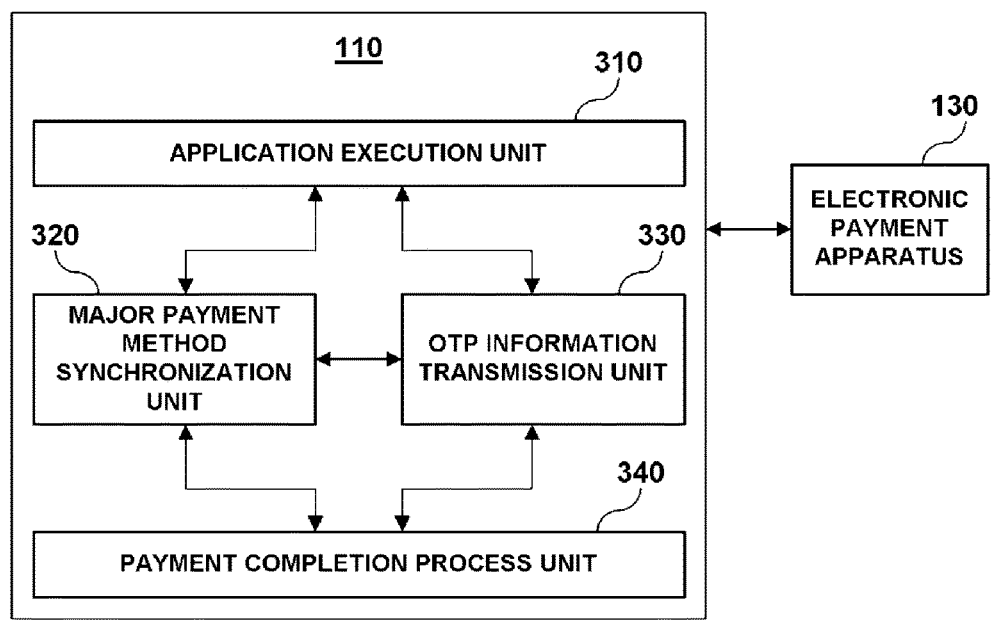
FIG. 3 is a block diagram schematically showing a terminal in accordance with a preferred embodiment of the present invention.

FIG. 3 is a block diagram schematically showing a terminal in accordance with a preferred embodiment of the present invention.

The terminal 110 according to the present embodiment comprises an application execution unit 310, a major payment method synchronization unit 320, an OTP information transmission unit 330, and a payment completion process unit 340. While it is described in this present embodiment that the terminal 110 comprises only the application execution unit 310, the major payment method synchronization unit 320, the OTP information transmission unit 330, and the payment completion process unit 340, this is merely illustrative of the spirit of the embodiment of the present invention, and many alterations and modifications may be made to the components included in the terminal 110 by those having ordinary skill in the art without departing from the spirit of the present invention. Meanwhile, the application execution unit 310, the major payment method synchronization unit 320, the OTP information transmission unit 330, and the payment completion process unit 340 shown in FIG. 3 may be implemented as the electronic payment application 112.

The application execution unit 310 executes the electronic payment application 112 in response to a push message received from the electronic payment apparatus 130. That is, when receiving a push message including at least one message based on SMS, MMS, and IP, the application execution unit 310 may invoke the installed electronic payment application 112. When authentication information input to authenticate payment request information by the user's manipulation or command is authenticated, the major payment method synchronization unit 320 transmits selected payment method information to the electronic payment apparatus 130. The authentication information is PIN information on the electronic payment application 112.

When the payment method information is synchronized with the electronic payment apparatus 130, the OTP information transmission unit 330 generates OTP information based on the payment method information and transmits the generated OTP information to the electronic payment apparatus 130. Here, the process in which the OTP information transmission unit 330 generates the OTP information will now be described. For the electronic payment, the OTP information transmission unit 330 performs member registration and payment method registration using the electronic payment application 112 and, at this time, the OTP information transmission unit 330 receives and encrypts an OTP authentication key based on the payment method and stores the encrypted OTP authentication key during the registration of the payment method. Therefore, the OTP information transmission unit 330 may generate pre-stored OTP information based on the selected payment method and display the generated information or may directly transmit the generated OTP information to the electronic payment apparatus 130. For example, when a major payment method is synchronized, the OTP information transmission unit 330 may generate OTP information for the payment method information and display the generated OTP information, and the user may identify the OTP information and directly input the OTP information to the electronic payment apparatus 130 using the terminal 110. That is, when the payment method information is synchronized, the OTP information transmission unit 330 may generate OTP information for the payment method information and directly transmit the generated OTP information key to the electronic payment apparatus 130. The payment completion process unit 340 receives payment completion information from the electronic payment apparatus 130 and displays the received information.

Figure 4:
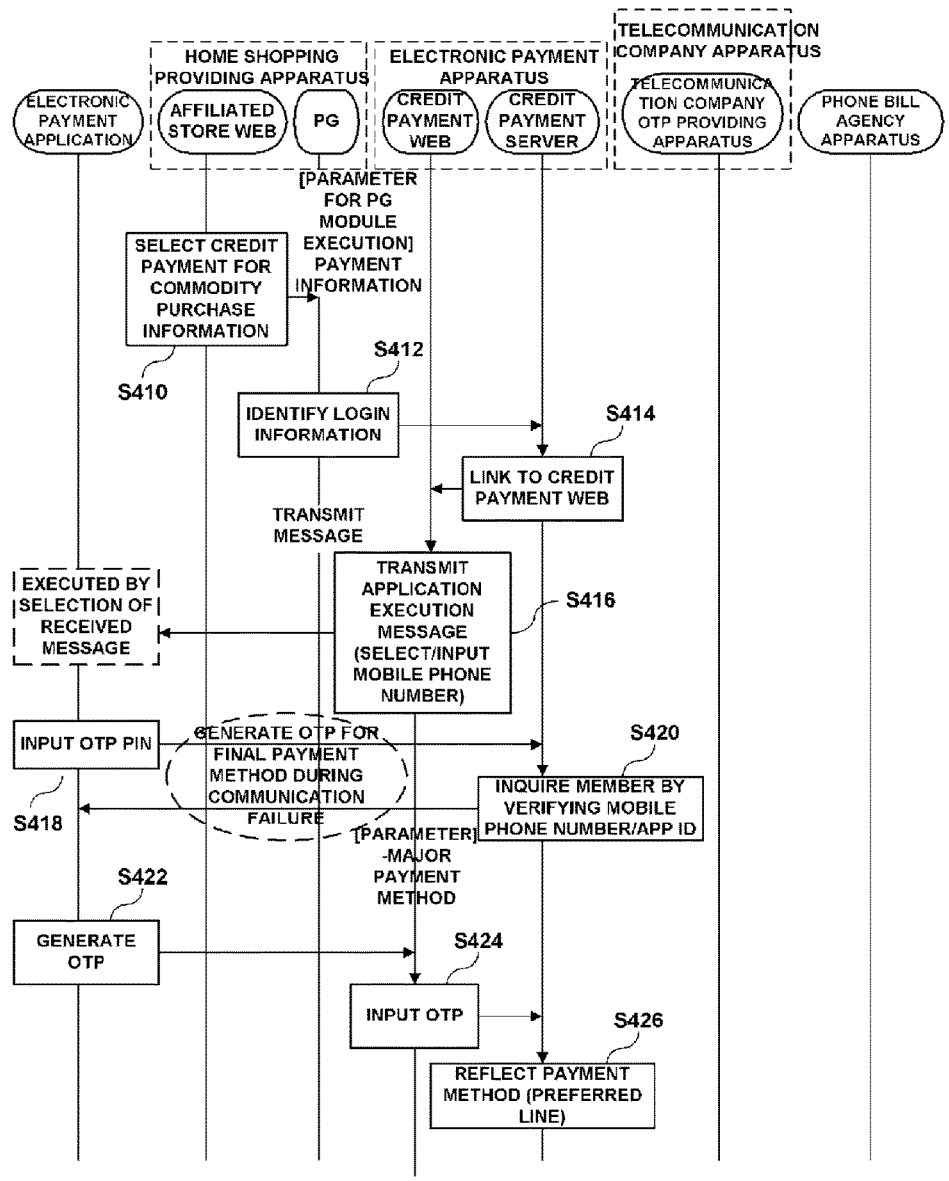
FIG. 4 is a flowchart showing an electronic payment method using login information in accordance with a preferred embodiment of the present invention.

FIG. 4 is a flowchart showing an electronic payment method using login information in accordance with a preferred embodiment of the present invention.

After accessing the commodity information providing apparatus 122 through the user terminal 114, the user logs into (or automatically logs into) the commodity information providing apparatus 122 using his or her user account (ID and password) and selects payment request information from the commodity information provided by the commodity information providing apparatus 122 when he or she wants to purchase a specific commodity (S410). That is, in step S410, the user terminal 114 accesses the commodity information providing apparatus 122 to display the commodity information received from the commodity information providing apparatus 122 and transmits the payment request information for the specific commodity information to the electronic payment apparatus 130 via the commodity information providing apparatus 122. At this time, the commodity information providing apparatus 122 comprises at least one of a web providing device for providing specific commodity information and a PG for linking to the electronic payment apparatus 130 in response to the payment request information and thus links the user terminal 114 to the electronic payment apparatus 130 (S412).

When the payment request information is received from the commodity information providing apparatus 122, the electronic payment apparatus 130 identifies login information of user account information for the payment request information, transmits at least one of retained payment method information and preferred payment method information to the user terminal 114, which has accessed the commodity information providing apparatus 122, based on the result of the determination (S414). In step S414, the electronic payment apparatus 130 determines whether the commodity information providing apparatus 122 supports automatic login and approves automatic login for the user account information and transmits at least one of retained payment method information and preferred payment method information to the user terminal 114 based on the result of the determination. At this time, for the determination of a customer with high access frequency, when it is determined that the commodity information providing apparatus 122 supports the automatic login and approves the automatic login for the user account information, the electronic payment apparatus 130 identifies the user account information as a customer with high access frequency and transmits the retained payment method information and the preferred payment method information to the user terminal 114. Moreover, when the purchase of the purchaser is the first time, the commodity information providing apparatus 122 identifies purchase history information of the user account information of the customer with high access frequency, and when it is determined that the payment request information is a first purchase request, transmits only the retained payment method information to the user terminal 114. Meanwhile, when the purchase of the purchaser is not the first time, the login information identification unit 212 identifies the purchase history information of the user account information of the customer with high access frequency, and when it is determined that there is the purchase history information in the payment request information, transmits only the retained payment method information and the preferred payment method information to the user terminal 114. Meanwhile, the login information identification unit 212 identifies the payment method of the purchase history information, and when it is determined that the used payment method is one, sets information about the finally used payment method as the preferred payment method.

The electronic payment apparatus 130 receives the payment request information for the user account information from the commodity information providing apparatus 122 and transmits a push message for executing the electronic payment application 112 to the terminal 110 having identification information corresponding to specific user account information (S416). In step S416, the electronic payment apparatus 130 may request identification information corresponding to the user account information or request input of OTP information from the user terminal 114. Here, the identification information includes at least one of phone number information, MDN, and ESN. In step S416, for the transmission of the push message, the electronic payment apparatus 130 determines whether there is pre-stored identification information, and when it is determined that there is the pre-stored identification information, transmits the push message to the terminal 110 having the pre-stored identification information. Whereas, when it is determined that there is no pre-stored identification information, the electronic payment apparatus 130 receives the identification information from the user terminal 114 that has accessed the commodity information providing apparatus 122 and transmits the push message to the terminal 110 having the received identification information. For example, after accessing the commodity information providing apparatus 122 through the user terminal 114, the user logs into the commodity information providing apparatus 122 using his or her user account (ID and password) and selects payment request information from commodity information provided by the commodity information providing apparatus 122 when he or she wants to purchase a specific commodity. At this time, when phone number information corresponding to the identification information is pre-stored in the user account, the electronic payment apparatus 130 transmits the push message to a terminal having the pre-stored phone number information. Whereas, when the phone number information corresponding to the identification information is not pre-stored in the corresponding account, the electronic payment apparatus 130 requests the user to enter the phone number and then transmits the push message to the terminal using the input phone number information. Here, the push message includes at least one message based on SMS, MMS, and IP.

The terminal 110 executes the electronic payment application 112 in response to the push message received from the electronic payment apparatus 130. Moreover, when authentication information input to authenticate the payment request information by the user's manipulation or command is authenticated, the terminal 110 transmits the selected payment method information to the electronic payment apparatus 130 (S418). In step S418, when receiving a push message including at least one message based on SMS, MMS, and IP, the terminal 110 may invoke the installed electronic payment application 112. Moreover, when the authentication information input to authenticate the payment request information by the user's manipulation or command is authenticated, the terminal 110 transmits pre-stored payment method information to the electronic payment apparatus 130. Here, the authentication information is PIN information on the electronic payment application 112.

The electronic payment apparatus 130 receives the payment method information from the terminal 110, synchronizes the received information, and then inquires a corresponding member using pre-stored phone number information and electronic payment application ID information (S420). When the payment method information is synchronized with the electronic payment apparatus 130, the terminal 110 generates OTP information based on the payment method information and transmits the generated OTP information to the electronic payment apparatus 130 (S422). In step S422, for the generation of the OTP authentication, the terminal 110 performs member registration and payment method registration using the electronic payment application 112 and, at this time, the terminal 110 receives and encrypts an OTP authentication key based on the payment method and stores the encrypted OTP authentication key during the registration of the payment method. Therefore, the terminal 110 may generate pre-stored OTP information based on the selected payment method and display the generated information or may directly transmit the generated OTP information to the electronic payment apparatus 130. For example, when a major payment method is synchronized, the terminal 110 may generate OTP information for the payment method information and display the generated OTP information, and the user may identify the OTP information and directly input the OTP information to the electronic payment apparatus 130 using the terminal 110. Moreover, when the major payment method is synchronized, the terminal 110 may generate OTP information for the payment method information and directly transmit the generated OTP information to the electronic payment apparatus 130.

When the payment method information is synchronized with the terminal 110, the electronic payment apparatus 130 receives OTP information corresponding to the payment method information from the terminal 110 and authenticates the OTP information using at least one of the card company apparatus 162 and the telecommunication company apparatus 140 based on the payment method information (S424). In step S424, for the authentication of the OTP information, the electronic payment apparatus 130 identifies the payment method information synchronized with the terminal 110, and when it is determined that the payment method information is credit card information, authenticates the OTP information using the card company OTP providing apparatus 164 connected to the card company apparatus 162. Here, the electronic payment apparatus 130 transmits an OTP authentication request signal to the card company OTP providing apparatus 164, receives an OTP authentication response signal corresponding to the OTP authentication request signal, and determines whether the OTP information is authenticated. Meanwhile, in step S424, when it is determined that the payment method information is phone bill information, the electronic payment apparatus 130 authenticates the OTP information using the telecommunication company OTP providing apparatus 142 connected to the telecommunication company apparatus 140. Here, the electronic payment apparatus 130 transmits an OTP authentication request signal to the telecommunication company OTP providing apparatus 142, receives an OTP authentication response signal corresponding to the OTP authentication request signal, and determines whether the OTP information is authenticated.

The electronic payment apparatus 130 reflects the payment method information based on the result of the determination of the login information (S426). That is, the payment method information selected by the user from the retained payment method information and the preferred payment method information based on the result of the determination of the login information can be reflected in step S426. With the guidance of the payment method information based on the result of the determination of the login information, the user can more conveniently perform the payment. Here, step S426 is not defined as an essential step and may be omitted if necessary.

While it is described in FIG. 4 that steps S410 to S426 are sequentially performed, this is merely illustrative of the spirit of the embodiment of the present invention, and many alterations and modifications may be made to the steps described in FIG. 4 in a manner that the sequence shown in FIG. 4 is changed or at least two of steps S410 to S426 are performed in parallel by those having ordinary skill in the art without departing from the spirit of the present invention, and thus FIG. 4 is not limited to the time-series sequence.

As mentioned above, the electronic payment method using the login information shown in FIG. 4 according to the present embodiment may be implemented in a program and recorded on a computer-readable medium. The computer-readable medium on which the program for implementing the electronic payment method using the login information according to the present embodiment is recorded includes all types of recording devices storing data readable by computer systems. Examples of the computer-readable recording medium include ROM, RAM, CD-ROM, magnetic tapes, floppy disks, optical data storage devices, etc. and also include those implemented in the form of a carrier wave (e.g., transmission through the Internet). Moreover, the computer-readable recording medium may be distributed in a computer system connected to a network, in which computer readable codes can be stored and executed in a distributed manner. Furthermore, functional programs, codes, and code segments for implementing the present embodiment can be easily construed by programmers skilled in the art to which the present embodiment pertains.

Figure 5A:
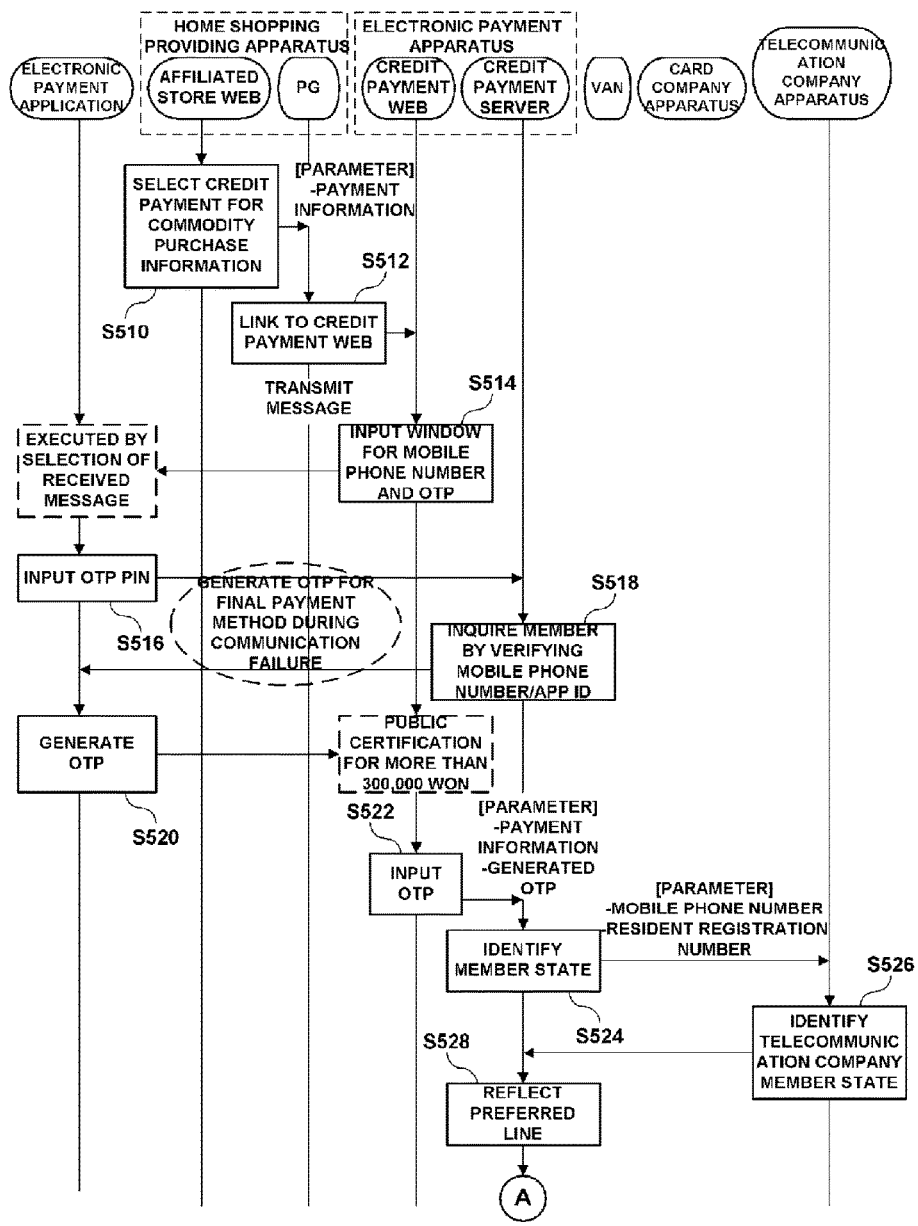

FIGS. 5A and 5B are flowcharts showing an electronic payment method using credit card information in accordance with another embodiment of the present invention.

After accessing the commodity information providing apparatus 122 through the user terminal 114, the user logs into the commodity information providing apparatus 122 using his or her user account (ID and password) and selects payment request information from the commodity information provided by the commodity information providing apparatus 122 when he or she wants to purchase a specific commodity (S510). At this time, the commodity information providing apparatus 122 comprises at least one of a web providing device for providing specific commodity information and a PG for linking to the electronic payment apparatus 130 in response to the payment request information and thus links the user terminal 114 to the electronic payment apparatus 130 (S512).

The electronic payment apparatus 130 receives payment request information for specific user account information from the commodity information providing apparatus 122 and transmits a push message for executing the electronic payment application 112 to the terminal 110 having identification information corresponding to the specific user account information (S514). In S514, the electronic payment apparatus 130 may request identification information corresponding to the user account information or request input of OTP information from the user terminal 114. Here, the identification information includes at least one of phone number information, MDN, and ESN. The process of transmitting the push message in step S514 will now be described in more detail. The electronic payment apparatus 130 determines whether there is pre-stored identification information, and when it is determined that there is the pre-stored identification information, transmits the push message to the terminal 110 having the pre-stored identification information. Whereas, when it is determined that there is no pre-stored identification information, the electronic payment apparatus 130 receives the identification information from the user terminal 114 that has accessed the commodity information providing apparatus 122 and transmits the push message to the terminal 110 having the received identification information. For example, after accessing the commodity information providing apparatus 122 through the user terminal 114, the user logs into the commodity information providing apparatus 122 using his or her user account (ID and password) and selects payment request information from the commodity information provided by the commodity information providing apparatus 122 when he or she wants to purchase a specific commodity. At this time, when phone number information corresponding to the identification information is pre-stored in the user account, the electronic payment apparatus 130 transmits the push message to the terminal having the pre-stored phone number information. Whereas, when the phone number information corresponding to the identification information is not pre-stored in the corresponding account, the electronic payment apparatus 130 requests the user to enter the phone number and then transmits the push message to the terminal using the input phone number information. Here, the push message includes at least one message based on SMS, MMS, and IP.

The terminal 110 executes the electronic payment application 112 in response to the push message received from the electronic payment apparatus 130. Moreover, when authentication information input to authenticate the payment request information by the user's manipulation or command is authenticated, the terminal 110 transmits pre-stored payment method information to the electronic payment apparatus 130 such that a major payment method is synchronized (S516). In step S516, when receiving a push message including at least one message based on SMS, MMS, and IP, the terminal 110 may invoke the installed electronic payment application 112. Moreover, when the authentication information input to authenticate the payment request information by the user's manipulation or command is authenticated, the terminal 110 transmits the pre-stored payment method information to the electronic payment apparatus 130. Here, the authentication information is PIN information on the electronic payment application 112. Moreover, the electronic payment apparatus 130 may receive and synchronize the payment method information and then inquire a corresponding member using pre-stored phone number information and electronic payment application ID information.

The electronic payment apparatus 130 receives the payment method information from the terminal 110, synchronizes the received information, and then inquires a corresponding member using pre-stored phone number information and electronic payment application ID information (S518). When the major payment method is synchronized, the terminal 110 generates OTP information for the payment method information and transmits the generated OTP information to the electronic payment apparatus 130 (S520). The process in which the terminal 110 generates the OTP information in step S520 in will now be described in detail. For the electronic payment, the terminal 110 performs member registration and payment method registration using the electronic payment application 112 and, at this time, the terminal 110 receives and encrypts an OTP authentication key based on the payment method and stores the encrypted OTP authentication key during the registration of the payment method. Therefore, the terminal 110 may generate pre-stored OTP information based on the selected payment method and display the generated information or may directly transmit the generated OTP information to the electronic payment apparatus 130. For example, when a major payment method is synchronized, the terminal 110 may generate OTP information for the payment method information and display the generated OTP information, and the user may identify the OTP information and directly input the OTP information to the electronic payment apparatus 130 using the terminal 110. Moreover, when the major payment method is synchronized, the terminal 110 may generate OTP information for the payment method information and directly transmit the generated OTP information to the electronic payment apparatus 130.

When the payment method information is synchronized with the terminal 110, the electronic payment apparatus 130 receives OTP information corresponding to the payment method information from the terminal 110 (S522) and identifies telecommunication company member information on the terminal 110 using the telecommunication company apparatus 140 (S524). Meanwhile, in step S524, the electronic payment apparatus 130 identifies at least one of phone number information, electronic payment application ID information, name information, and service subscription information to identify the telecommunication company member state. At this time, when the synchronized payment method information is credit card information, the electronic payment apparatus 130 authenticates the OTP information using the card company apparatus 162.

The telecommunication company apparatus 140 receives a request signal for the telecommunication company member information from the electronic payment apparatus 130 and transmits a response signal determining whether the corresponding telecommunication company member information is authenticated to the electronic payment apparatus 130 (S526). When the telecommunication company member information is identified as an authorized member, the electronic payment apparatus 130 reflects preferred payment method (line) information in the user account information that has accessed the commodity information providing apparatus 122 (S528). Here, step S528 is not defined as an essential step and may be omitted if necessary.

When the telecommunication company member information is identified as an authorized member, the electronic payment apparatus 130 transmits an authorization request signal for the electronic payment to the value-added communication network 160 (S530). Then, the electronic payment apparatus 130 may receive an authorization response signal corresponding to the authorization request signal from the value-added communication network 160. Moreover, the electronic payment apparatus 130 may transmit a signal indicating that the input OTP information is authenticated to the user terminal 114 that has accessed the commodity information providing apparatus 122. Here, the authorization request signal includes at least one of card nickname information, member number information, identification information, OTP information, virtual card number information, and resident registration number information. Here, the card nickname information refers to the information input by the user's manipulation or command.

When the electronic payment apparatus 130 transmits the transaction authorization request signal for the major payment method to the commodity information providing apparatus 122, the commodity information providing apparatus 122 transmits a transaction authorization request signal for the major payment method to the card company apparatus 162 (S532). At this time, the electronic payment apparatus 130 may authenticate the OTP information using the card company apparatus 162. The card company apparatus 162 performs transaction authorization in response to the transaction authorization request signal and transmits a transaction authorization response signal corresponding to the transaction authorization request signal (for the virtual card number information or real card number information) to the commodity information providing apparatus 122 via the electronic payment apparatus 130 (S534). Here, the transaction authorization request signal includes at least one of card nickname information, virtual card number information, and OTP information.

The electronic payment apparatus 130 transmits a payment information verification completion signal to the commodity information providing apparatus 122 (S536). In step S536, the electronic payment apparatus 130 receives the transaction authorization response signal corresponding to the transaction authorization request signal from the card company apparatus 162 and transmits the payment information verification completion signal to the commodity information providing apparatus 122. Here, the payment information verification completion signal includes link information for a result information page. The terminal 110 or the user terminal 114 receives payment completion information from the commodity information providing apparatus 122 and displays the received information (S538).

While it is described in FIGS. 5A and 5B that steps S510 to S538 are sequentially performed, this is merely illustrative of the spirit of the embodiment of the present invention, and many alterations and modifications may be made to the steps described in FIGS. 5A and 5B in a manner that the sequence shown in FIGS. 5A and 5B is changed or at least two of steps S510 to S538 are performed in parallel by those having ordinary skill in the art without departing from the spirit of the present invention, and thus FIGS. 5A and 5B are not limited to the time-series sequence.

As mentioned above, the electronic payment method using credit card information shown in FIGS. 5A and 5B according the present embodiment may be implemented in a program and recorded on a computer-readable medium. The computer-readable medium on which the program for implementing the electronic payment method using credit card information according to the present embodiment is recorded includes all types of recording devices storing data readable by computer systems. Examples of the computer-readable recording medium include ROM, RAM, CD-ROM, magnetic tapes, floppy disks, optical data storage devices, etc. and also include those implemented in the form of a carrier wave (e.g., transmission through the Internet). Moreover, the computer-readable recording medium may be distributed in a computer system connected to a network, in which computer readable codes can be stored and executed in a distributed manner. Furthermore, functional programs, codes, and code segments for implementing the present embodiment can be easily construed by programmers skilled in the art to which the present embodiment pertains.

Figure 6A:
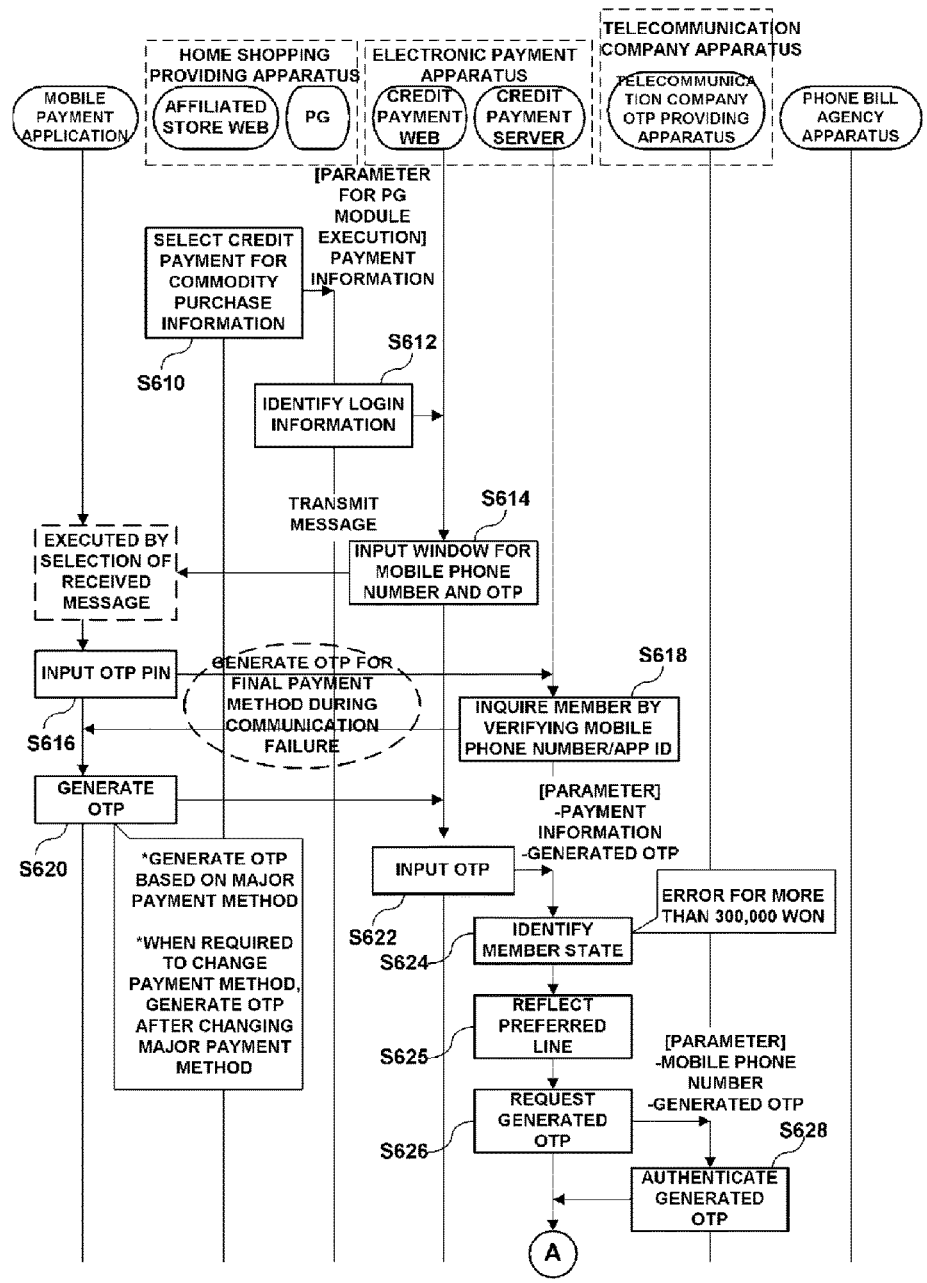
FIGS. 6A and 6B are flowcharts showing an electronic payment method using phone bill information in accordance with still another embodiment of the present invention.
Figure 6B:
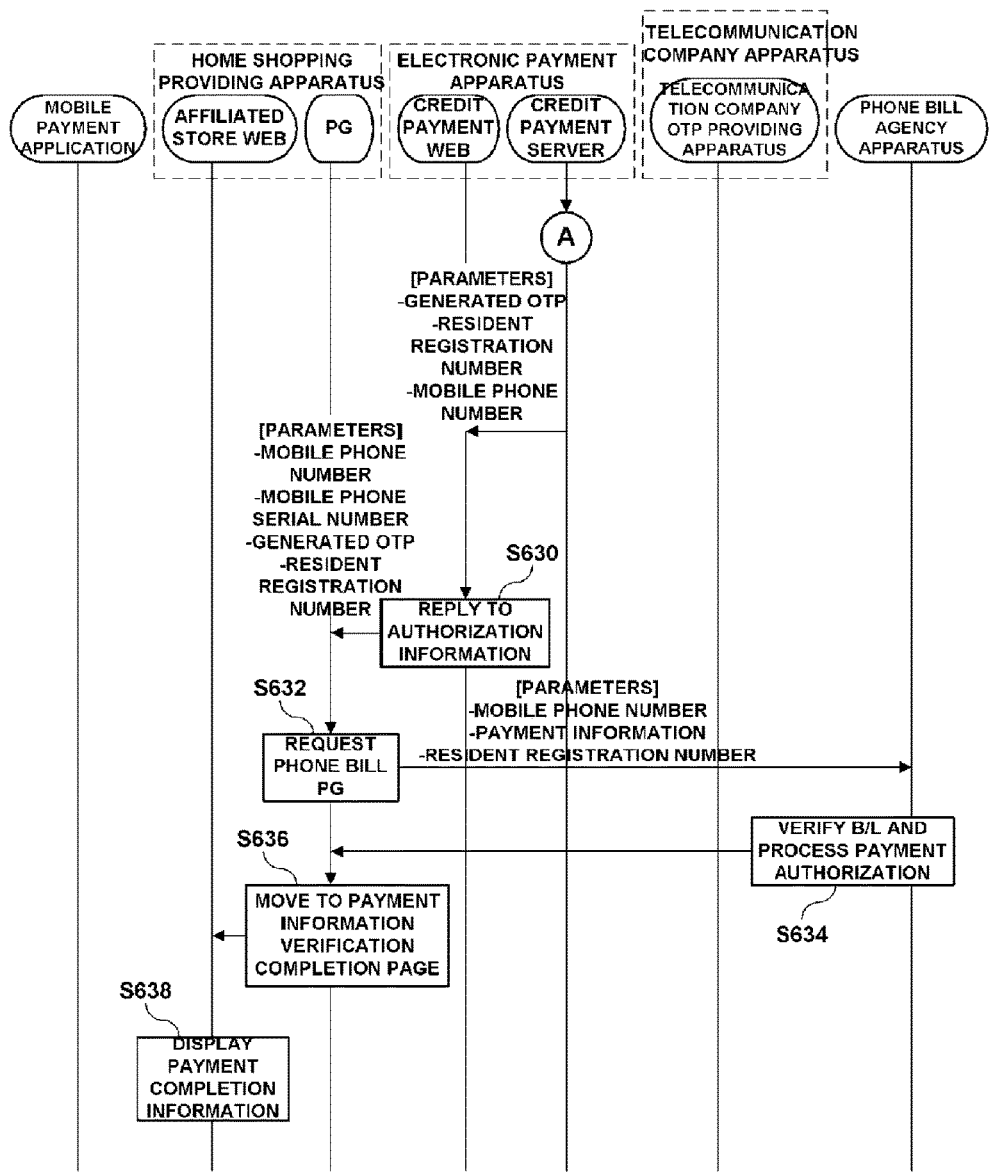

FIGS. 6A and 6B are flowcharts showing an electronic payment method using phone bill information in accordance with still another embodiment of the present invention.

After accessing the commodity information providing apparatus 122 through the user terminal 114, the user logs into the commodity information providing apparatus 122 using his or her user account (ID and password) and selects payment request information from the commodity information provided by the commodity information providing apparatus 122 when he or she wants to purchase a specific commodity (S610). At this time, the commodity information providing apparatus 122 comprises at least one of a web providing device for providing specific commodity information and a PG for linking to the electronic payment apparatus 130 in response to the payment request information and thus links the user terminal 114 to the electronic payment apparatus 130 (S612).

The electronic payment apparatus 130 receives payment request information for specific user account information from the commodity information providing apparatus 122 and transmits a push message for executing the electronic payment application 112 to the terminal 110 having identification information corresponding to the specific user account information (S614). In S614, the electronic payment apparatus 130 may request identification information corresponding to the user account information or request input of OTP information from the user terminal 114. Here, the identification information includes at least one of phone number information, MDN, and ESN. The process of transmitting the push message in step S614 will now be described in more detail. The electronic payment apparatus 130 determines whether there is pre-stored identification information, and when it is determined that there is the pre-stored identification information, transmits the push message to the terminal 110 having the pre-stored identification information. Whereas, when it is determined that there is no pre-stored identification information, the electronic payment apparatus 130 receives the identification information from the user terminal 114 that has accessed the commodity information providing apparatus 122 and transmits the push message to the terminal 110 having the received identification information. For example, after accessing the commodity information providing apparatus 122 through the user terminal 114, the user logs into the commodity information providing apparatus 122 using his or her user account (ID and password) and selects payment request information from the commodity information provided by the commodity information providing apparatus 122 when he or she wants to purchase a specific commodity. At this time, when phone number information corresponding to the identification information is pre-stored in the user account, the electronic payment apparatus 130 transmits the push message to a terminal having the pre-stored phone number information. Whereas, when the phone number information corresponding to the identification information is not pre-stored in the corresponding account, the electronic payment apparatus 130 requests the user to enter the phone number and then transmits the push message to the terminal using the input phone number information. Here, the push message includes at least one message based on SMS, MMS, and IP.

The terminal 110 executes the electronic payment application 112 in response to the push message received from the electronic payment apparatus 130. Moreover, when authentication information input to authenticate the payment request information by the user's manipulation or command is authenticated, the terminal 110 transmits payment method information including phone bill information among pre-stored information to the electronic payment apparatus 130 (S616). In step S616, when receiving a push message including at least one message based on SMS, MMS, and IP, the terminal 110 may invoke the installed electronic payment application 112. Moreover, when the authentication information input to authenticate the payment request information by the user's manipulation or command is authenticated, the terminal 110 transmits the pre-stored payment method information to the electronic payment apparatus 130. Here, the authentication information is PIN information on the electronic payment application 112.

The electronic payment apparatus 130 receives the payment method information from the terminal 110 having the identification information corresponding to the specific user account information, synchronizes the received information, and then inquires a corresponding member using pre-stored phone number information and electronic payment application ID information (S618). When the payment method information is synchronized, the terminal 110 generates OTP information based on the phone bill information and transmits the generated OTP information to the electronic payment apparatus 130 (S620). The process in which the terminal 110 generates the OTP information in step S620 in will now be described in detail. For the electronic payment, the terminal 110 performs member registration and payment method registration using the electronic payment application 112 and, at this time, the terminal 110 receives and encrypts an OTP authentication key based on the payment method and stores the encrypted OTP authentication key during the registration of the payment method. For example, when a major payment method is synchronized, the terminal 110 may generate OTP information for the payment method information and display the generated OTP information, and the user may identify the OTP information and directly input the OTP information to the electronic payment apparatus 130 using the terminal 110. Moreover, when the major payment method is synchronized, the terminal 110 may generate OTP information for the payment method information and directly transmit the generated OTP information to the electronic payment apparatus 130.

When the payment method information is synchronized with the terminal 110, the electronic payment apparatus 130 receives OTP information corresponding to the payment method information from the terminal 110 (S622). When telecommunication company member information is identified as an authorized member, the electronic payment apparatus 130 allows user account information, which has accessed the commodity information providing apparatus 122, to be logged into the electronic payment apparatus 130. Here, step S622 is not defined as an essential step and may be omitted if necessary.

When the OTP information corresponding to the payment method information is received from the terminal 110 and when the corresponding OTP information is authenticated, the electronic payment apparatus 130 identifies telecommunication company member information on the terminal 110 using the telecommunication company apparatus 140 (S624). Meanwhile, in step S624, the electronic payment apparatus 130 identifies at least one of phone number information, electronic payment application ID information, name information, and service subscription information to identify the telecommunication company member state. At this time, when the synchronized payment method information is credit card information, the electronic payment apparatus 130 authenticates the OTP information using the card company apparatus 162. That is, the telecommunication company apparatus 140 receives a request signal for the telecommunication company member information from the electronic payment apparatus 130 and transmits a response signal determining whether the corresponding telecommunication company member information is authenticated to the electronic payment apparatus 130.

When the telecommunication company member information is identified as an authorized member, the electronic payment apparatus 130 reflects preferred payment method (line) information in the user account information that has accessed the commodity information providing apparatus 122 (S625). Here, step S628 is not defined as an essential step and may be omitted if necessary.

When the synchronized payment method information is phone bill information, the electronic payment apparatus 130 authenticates the OTP information using the telecommunication company OTP providing apparatus 142 connected to the telecommunication company apparatus 140 by transmitting an OTP authentication request signal to the telecommunication company OTP providing apparatus 142 (S626). At this time, when the synchronized payment method information is the phone bill information, the electronic payment apparatus 130 authenticates the OTP information using the telecommunication company OTP providing apparatus 142 connected to the telecommunication company apparatus 140, and the OTP authentication request signal includes phone number information and OTP information based on the phone bill information.

In response to the OTP authentication request signal received from the electronic payment apparatus 130, the telecommunication company OTP providing apparatus 142 determines whether the OTP information based on the phone bill information received from the terminal 110, generates an OTP authentication response signal corresponding to the OTP authentication request signal based on the result of the determination, and transmits the generated signal to the electronic payment apparatus 130 (S628). At this time, the electronic payment apparatus 130 receives the OTP authentication response signal corresponding to the OTP authentication request signal from the telecommunication company OTP providing apparatus 142 and determines whether the OTP information is authenticated.

When the OTP information is authenticated by the telecommunication company OTP providing apparatus 142, the electronic payment apparatus 130 transmits a transaction authorization request signal for the electronic payment to the commodity information providing apparatus 122 (S630). Here, the transaction authorization request signal includes at least one of OTP information, phone number information on the terminal 110, terminal identification information on the terminal 110, member number information corresponding to specific user account information, resident registration number information corresponding to specific user account information, and payment information. Then, the electronic payment apparatus 130 receives a transaction authorization response signal corresponding to the transaction authorization request signal from the commodity information providing apparatus 122. Moreover, in step S630, the electronic payment apparatus 130 may transmit a signal indicating that the input OTP information is authenticated to the user terminal 114 that has accessed the commodity information providing apparatus 122.

The electronic payment apparatus 130 transmits a transaction authorization request signal for performing the electronic payment using the phone bill information to the phone bill agency apparatus 150 (S632). At this time, the electronic payment apparatus 130 may transmit phone number information, payment information, and resident registration number information to the phone bill agency apparatus 150. The electronic payment apparatus 130 performs black list (B/L) verification for the transaction authorization request signal through the phone bill agency apparatus 150, and when the B/L verification is completed, receives a transaction authorization response signal corresponding to the transaction authorization request signal from the phone bill agency apparatus 150 (S634). In step S634, the phone bill agency apparatus 150 receives the transaction authorization request signal from the electronic payment apparatus 130, performs the B/L verification by comparing pre-stored terminal IP B/L information, USIM B/L information, terminal identification B/L information, and parameters included in the transaction authorization request signal, generates a transaction authorization response signal corresponding to the transaction authorization request signal based on the result of the authorization, and transmits the generated signal to the electronic payment apparatus 130.

The electronic payment apparatus 130 transmits a payment information verification completion signal to the commodity information providing apparatus 122 (S636). In step S636, the electronic payment apparatus 130 receives the transaction authorization response signal corresponding to the transaction authorization request signal from the phone bill agency apparatus 150 and transmits the payment information verification completion signal to the commodity information providing apparatus 122. Here, the payment information verification completion signal includes link information for a result information page. The terminal 110 or the user terminal 114 receives payment completion information from the commodity information providing apparatus 122 and displays the received information (S638).

While it is described in FIGS. 6A and 6B that steps S610 to S638 are sequentially performed, this is merely illustrative of the spirit of the embodiment of the present invention, and many alterations and modifications may be made to the steps described in FIGS. FIGS. 6A and 6B in a manner that the sequence shown in FIGS. 6A and 6B is changed or at least two of steps S610 to S638 are performed in parallel by those having ordinary skill in the art without departing from the spirit of the present invention, and thus FIGS. 6A and 6B are not limited to the time-series sequence.

As mentioned above, the electronic payment method using phone bill information shown in FIGS. 6A and 6B according the present embodiment may be implemented in a program and recorded on a computer-readable medium.

The computer-readable medium on which the program for implementing the electronic payment method using phone bill information according to the present embodiment is recorded includes all types of recording devices storing data readable by computer systems. Examples of the computer-readable recording medium include ROM, RAM, CD-ROM, magnetic tapes, floppy disks, optical data storage devices, etc. and also include those implemented in the form of a carrier wave (e.g., transmission through the Internet). Moreover, the computer-readable recording medium may be distributed in a computer system connected to a network, in which computer readable codes can be stored and executed in a distributed manner. Furthermore, functional programs, codes, and code segments for implementing the present embodiment can be easily construed by programmers skilled in the art to which the present embodiment pertains.

INDUSTRIAL APPLICABILITY

As described above, the present embodiment is a useful invention which can be applied to the field of electronic payment using login information, which identifies a user's login information in a process of performing an electronic payment to determine whether the user is a customer with high access frequency and provides at least one of information about a purchaser's retained payment method and preferred payment method based on the result of the determination such that the purchaser can more conveniently perform the payment.

Moreover, the present embodiment is a useful invention which can be applied to the field of electronic payment using phone bill information, which allows OTP information based on phone bill information selected by a user to be more safely authenticated through a telecommunication company.

Furthermore, the present embodiment is a useful invention which can be applied to the field of electronic payment using credit card information, which performs authentication through an OTP, a telecommunication company, or a card company based on payment method information selected by a user in a process of performing an electronic payment using credit card information, thus performing the electronic payment more safely.

The invention claimed is:

1. An electronic payment apparatus, the electronic payment apparatus comprising a processor, wherein said processor comprising:
   a payment information reception unit configured to receive, via a network, payment request information for user account information from a commodity information providing apparatus;
   a login information identification unit configured to
      identify login information of the user account information, and
      transmit, via the network, at least one of retained payment method information and preferred payment method information to a user terminal, which has accessed the commodity information providing apparatus, based on the result of identification;
   a payment method synchronization unit configured to
      receive, via the network, payment method information from the user terminal having identification information corresponding to the user account information and
      synchronize the received payment method information;
   an one-time password (OTP) information authentication unit configured to
      receive, via the network, OTP information corresponding to the received payment method information from the user terminal and
      authenticate the received OTP information using at least one of a card company apparatus and a telecommunication company apparatus based on the received payment method information; and
   a payment authorization unit configured to, when the received OTP information is authenticated,
      transmit, via the network, a transaction authorization request signal for the synchronized payment method information to at least one of the card company apparatus and the telecommunication company apparatus,
      receive, via the network, a transaction authorization response signal corresponding to the transaction authorization request signal, and
      transmit, via the network, a payment information verification completion signal to the commodity information providing apparatus,
   wherein the OTP information authentication unit is configured to identify the synchronized payment method information,
   wherein the retained payment method information is payment method pre-registered by a user using the user terminal for an electronic payment,
   wherein the preferred payment method information is payment method selected from payment methods used by the user, and
   wherein the login information identification unit is configured to
      determine whether the commodity information providing apparatus supports automatic login and approves automatic login for the user account information,
      identify the user account information as a customer with high access frequency, when it is determined that the commodity information providing apparatus supports the automatic login and approves the automatic login for the user account information, and
      transmit, via the network, the retained payment method information and the preferred payment method information to the user terminal when the user account information is identified as the customer with high access frequency.

2. The electronic payment apparatus of claim 1, wherein when it is determined that the commodity information providing apparatus supports the automatic login and approves the automatic login for the user account information, the login information identification unit is configure to
   identify purchase history information of the user account information of the customer with high access frequency, and
   when it is determined that the payment request information is a first purchase request, transmit only the retained payment method information to the user terminal.

3. The electronic payment apparatus of claim 1, wherein the login information identification unit is configured to
   identify purchase history information of the user account information of the customer with high access frequency, and
   when it is determined that there is the purchase history information in the payment request information, transmit only the retained payment method information and the preferred payment method information to the user terminal.

4. The electronic payment apparatus of claim 3, wherein the login information identification unit is configure to
identify payment method of the purchase history information, and
when it is determined that used payment method is one, set information about the finally used payment method as the preferred payment method.

5. The electronic payment apparatus of claim 1, wherein the OTP information authentication unit is configure to
identify the synchronized payment method information, and
when the synchronized payment method information is credit card information, authenticate the received OTP information using a card company OTP providing apparatus connected to the card company apparatus by transmitting an OTP authentication request signal to the card company OTP providing apparatus and receiving an OTP authentication response signal corresponding to the transmitted OTP authentication request signal.

6. The electronic payment apparatus of claim 5, wherein when the OTP information corresponding to the credit card information is received, the OTP information authentication unit identifies telecommunication company member information on the user terminal using the telecommunication company apparatus.

7. The electronic payment apparatus of claim 1, wherein the OTP information authentication unit identifies the synchronized payment method information, and when the payment method information is phone bill information, authenticates the OTP information using a telecommunication company OTP providing apparatus connected to the telecommunication company apparatus by transmitting an OTP authentication request signal to the telecommunication company OTP providing apparatus and receiving an OTP authentication response signal corresponding to the OTP authentication request signal,
wherein the telecommunication company OTP providing apparatus is different from the user terminal.

8. The electronic payment apparatus of claim 1, wherein when the synchronized payment method information is phone bill information, the OTP information authentication unit is configured to authenticate the received OTP information using a telecommunication company OTP providing apparatus connected to the telecommunication company apparatus by transmitting an OTP authentication request signal to the telecommunication company OTP providing apparatus and receiving an OTP authentication response signal corresponding to the OTP authentication request signal.

9. The electronic payment apparatus of claim 1, wherein when the received OTP information is authenticated, the payment authorization unit is configured to transmit the transaction authorization request signal for phone bill information to the commodity information providing apparatus.

10. The electronic payment apparatus of claim 9, wherein the payment authorization unit is configure to receive the transaction authorization response signal corresponding to the transaction authorization request signal from the phone bill agency apparatus connected to the commodity information providing apparatus.

11. The electronic payment apparatus of claim 9, wherein the payment authorization unit is configure to
perform black list (B/L) verification for the transaction authorization request signal through a phone bill agency apparatus, and
when the B/L verification is completed, receive the transaction authorization response signal corresponding to the transaction authorization request signal from the phone bill agency apparatus.

12. The electronic payment apparatus of claim 11, wherein the phone bill agency apparatus is configured to perform the B/L verification by comparing pre-stored terminal IP B/L information, USIM B/L information, terminal identification B/L information, and parameters included in the transaction authorization request signal.

13. The electronic payment apparatus of claim 1, wherein the transaction authorization request signal includes at least one of the OTP information, phone number information on the terminal, terminal identification information on the terminal, member number information corresponding to the user account information, payment information, card nickname information, virtual card number information, and resident registration number information corresponding to the user account information.

14. The electronic payment apparatus of claim 1, wherein the identification information includes at least one of phone number information, mobile directory number (MDN), and electronic serial number (ESN).

15. The electronic payment apparatus of claim 1, further comprising a message transmission unit which configured to transmit a push message for executing the electronic payment application to a terminal having identification information corresponding to the user account information.

16. The electronic payment apparatus of claim 15, wherein the message transmission unit is configured to
determine whether there is pre-stored identification information,
when it is determined that there is the pre-stored identification information, transmit the push message to the user terminal having the pre-stored identification information, and
when it is determined that there is no pre-stored identification information, receive the identification information from the user terminal, which has accessed the commodity information providing apparatus, and transmit the push message to the terminal having the received identification information.

17. The electronic payment apparatus of claim 1, further comprising a telecommunication company information authentication unit configured to, when OTP information corresponding to the payment method information is received from the terminal, identify telecommunication company member information on the terminal using the telecommunication company apparatus.

18. The electronic payment apparatus of claim 17, wherein when the synchronized payment method information is credit card information, the telecommunication company information authentication unit is configured to
authenticate the OTP information using the card company apparatus and
identify at least one of phone number information, electronic payment application ID information, name information, and service subscription information to identify the telecommunication company member state.

19. The electronic payment apparatus of claim 1, further comprising
an authorization unit configured to, when the telecommunication company member information is identified as an authorized member,
transmit an authorization request signal for the electronic payment to a value-added communication network (VAN) and
receive an authorization response signal corresponding to the authorization request signal, wherein the authorization request signal includes at least one of card nickname information, member number information, the identification information, the OTP information, virtual card number information, and resident registration number information.

20. An electronic payment method, which performs an electronic payment using login information in an electronic payment apparatus comprising a processor, the electronic payment method comprising the steps of:

receiving, via a network, payment request information for user account information from a commodity information providing apparatus;

identifying login information of the user account information and transmitting, via the network, at least one of retained payment method information and preferred payment method information to a user terminal, which has accessed the commodity information providing apparatus, based on the result of identification;

receiving, via the network, payment method information from the user terminal having identification information corresponding to the user account information and synchronizing the received payment method information;

receiving, via the network, one-time password (OTP) information corresponding to the received payment method information from the terminal and authenticating the received OTP information using at least one of a card company apparatus and a telecommunication company apparatus based on the received payment method information; and when the OTP information is authenticated, transmitting, via the network, a transaction authorization request signal for the synchronized payment method information to at least one of the card company apparatus and the telecommunication company apparatus, receiving, via the network, a transaction authorization response signal corresponding to the transaction authorization request signal, and transmitting, via the network, a payment information verification completion signal to the commodity information providing apparatus, wherein the electronic payment apparatus identifies the synchronized payment method information, and authenticates the received OTP information using at least one of the card company apparatus and the telecommunication company apparatus, wherein the retained payment method information is payment method pre-registered by a user using the user terminal for an electronic payment, and the preferred payment method information is payment method selected from payment methods used by the user, and wherein the transmitting at least one of retained payment method information and preferred payment method information to a user terminal comprises determining whether the commodity information providing apparatus supports automatic login and approves automatic login for the user account information, identifying the user account information as a customer with high access frequency, when it is determined that the commodity information providing apparatus supports the automatic login and approves the automatic login for the user account information, and transmitting, via the network, the retained payment method information and the preferred payment method information to the user terminal when the user account information is identified as the customer with high access frequency.

* * * * *